(12) United States Patent
Matsuura et al.

(10) Patent No.: US 7,688,156 B2
(45) Date of Patent: Mar. 30, 2010

(54) POLAR MODULATION TRANSMISSION CIRCUIT AND COMMUNICATION DEVICE

(75) Inventors: Toru Matsuura, Osaka (JP); Hisashi Adachi, Osaka (JP)

(73) Assignee: Panasonic Corporation, Osaka (JP)

( * ) Notice: Subject to any disclaimer, the term of this patent is extended or adjusted under 35 U.S.C. 154(b) by 403 days.

(21) Appl. No.: 11/887,483

(22) PCT Filed: Apr. 26, 2006

(86) PCT No.: PCT/JP2006/309197

§ 371 (c)(1),
(2), (4) Date: Sep. 28, 2007

(87) PCT Pub. No.: WO2006/118318

PCT Pub. Date: Nov. 9, 2006

(65) Prior Publication Data

US 2009/0079511 A1    Mar. 26, 2009

(30) Foreign Application Priority Data

Apr. 27, 2005  (JP) .............................. 2005-129270

(51) Int. Cl.
*H04B 1/02* (2006.01)
*H03C 3/09* (2006.01)

(52) U.S. Cl. .................. 332/145; 332/151; 455/108; 455/127.2; 375/300

(58) Field of Classification Search .................. 332/145, 332/151; 455/108, 127.2; 375/300
See application file for complete search history.

(56) References Cited

U.S. PATENT DOCUMENTS 3,805,191 A   4/1974  Kawai et al.

4,972,440 A  * 11/1990  Ernst et al. .................. 375/296

(Continued)

FOREIGN PATENT DOCUMENTS

JP       10-126164       5/1998

(Continued)

OTHER PUBLICATIONS

International Search Report issued Jul. 20, 2006 in the International (PCT) Application of which the present application is the U.S. National Stage.

(Continued)

*Primary Examiner*—Joseph Chang
(74) *Attorney, Agent, or Firm*—Wenderoth, Lind & Ponack, L.L.P.

(57) ABSTRACT

A transmission circuit for outputting transmission signals with a low distortion and a high efficiency over a wide range of output power is provided. A signal generation section (11) generates an amplitude signal and a phase signal. An angle modulation section (12) performs angle modulation on the phase signal and outputs an angle-modulated signal. A regulator (14) receives the amplitude signal via a variable gain amplification section (18) and supplies a voltage controlled based on the magnitude of the amplitude signal to the amplitude modulation section (15). The amplitude modulation section (15) performs amplitude modulation on the angle-modulated signal and outputs a modulated signal to the variable attenuation section (16). When the value of power information is smaller than a predetermined threshold value, the control section (19) increases the gain of the variable gain amplification section (18) and the attenuation of the variable attenuation section (16).

13 Claims, 24 Drawing Sheets

U.S. PATENT DOCUMENTS

| | | | |
|---|---|---|---|
| 5,973,557 A | 10/1999 | Miyaji et al. | |
| 6,101,224 A * | 8/2000 | Lindoff et al. | 375/300 |
| 6,366,177 B1 | 4/2002 | McCune et al. | |
| 7,023,292 B2 * | 4/2006 | Pehlke et al. | 332/151 |
| 7,171,170 B2 * | 1/2007 | Groe et al. | 455/108 |
| 2004/0219891 A1 | 11/2004 | Hadjichristos | |
| 2004/0247040 A1 | 12/2004 | Dennis et al. | |

FOREIGN PATENT DOCUMENTS

| | | |
|---|---|---|
| JP | 2005-45782 | 2/2005 |

OTHER PUBLICATIONS

Written Opinion of the International Searching Authority issued Jul. 20, 2006 in the International (PCT) Application of which the present application is the U.S. National Stage.

* cited by examiner

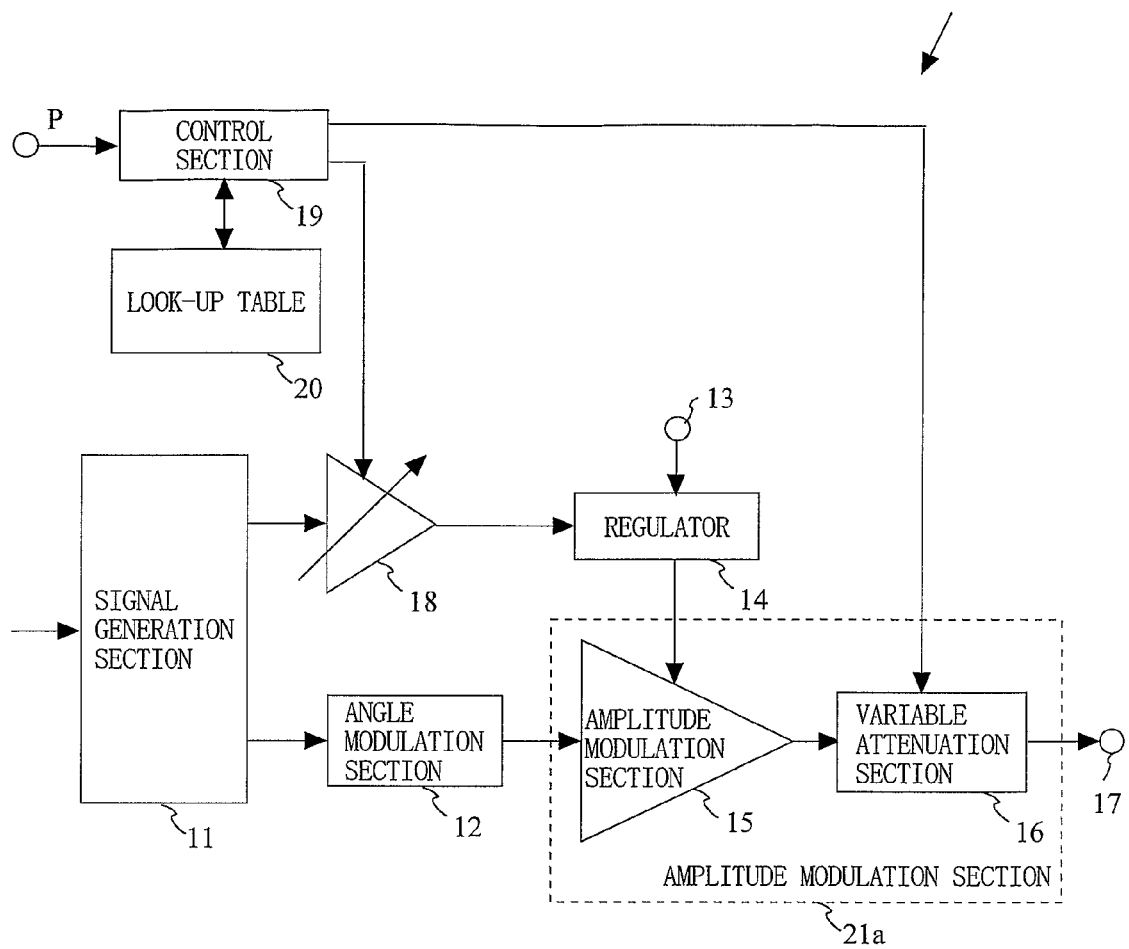
F I G. 1A

| LOOK-UP TABLE | | | | |
|---|---|---|---|---|
| POWER INFORMATION P | p1 | p2 | . . . | pn |
| ATTENUATION OF THE VARIABLE ATTENUATION SECTION 16 | X1 | X2 | . . . | Xn |
| GAIN OF THE VARIABLE GAIN AMPLIFICATION SECTION 18 | Y1 | Y2 | . . . | Yn |

VARIABLE ATTENUATION SECTION

VARIABLE GAIN AMPLIFICATION SECTION

F I G. 1 2
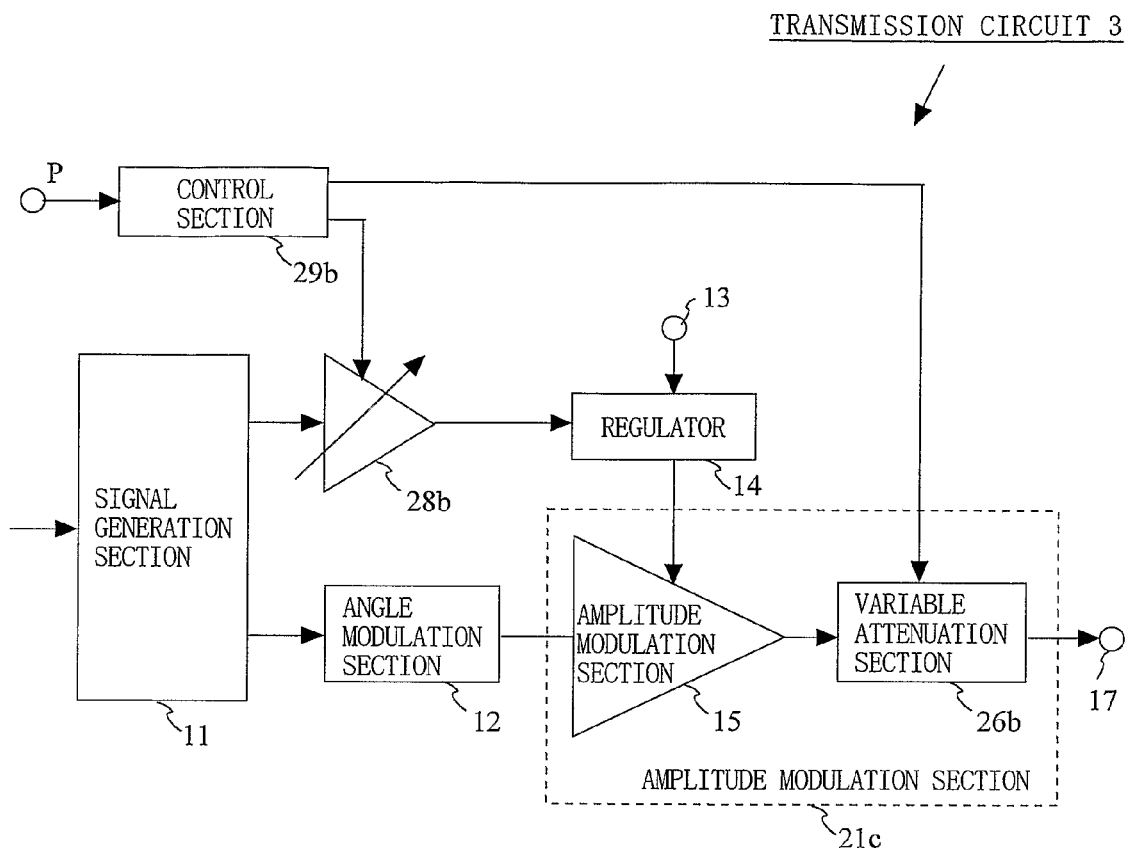

F I G. 1 6
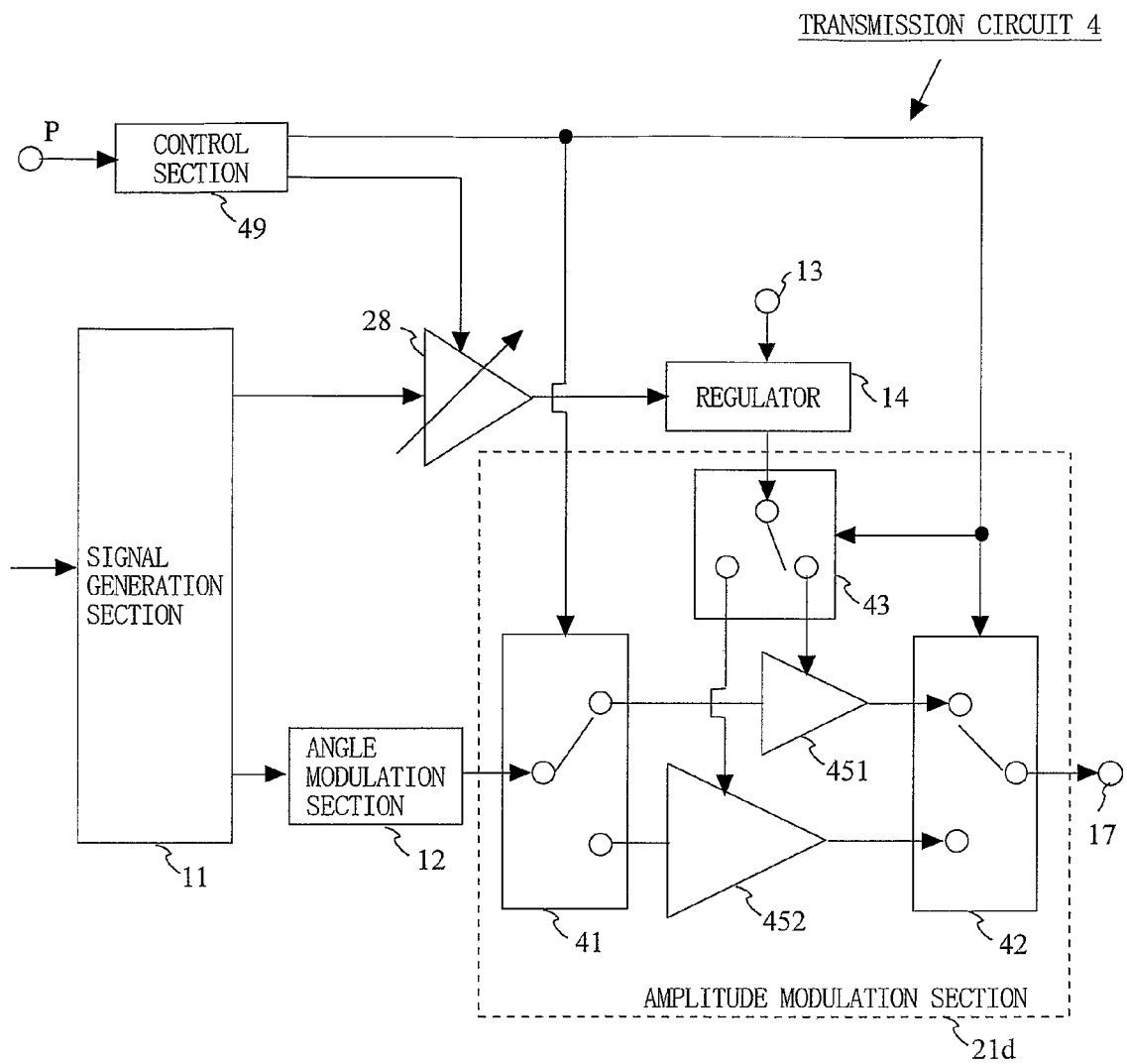

F I G. 1 7
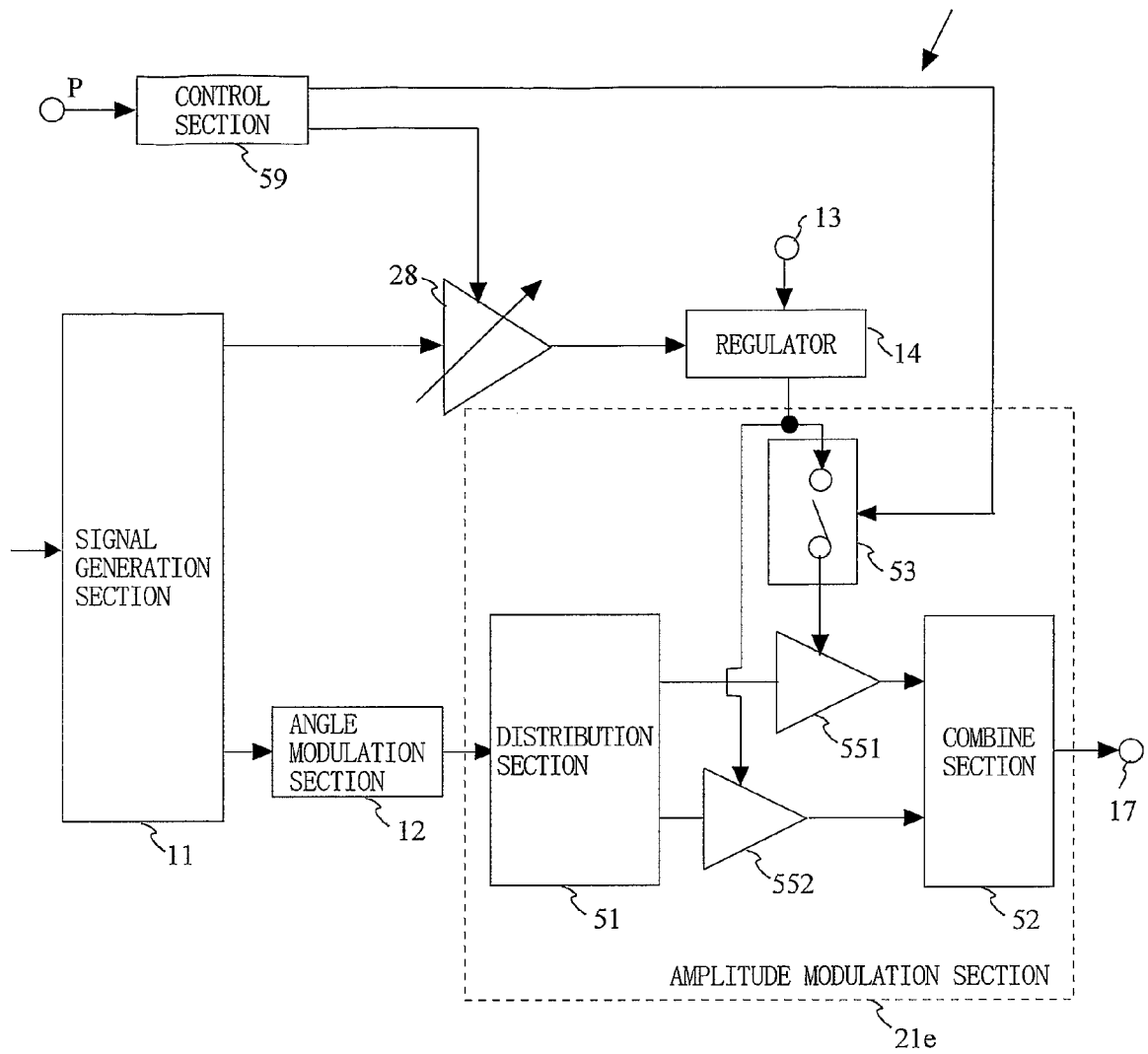

F I G. 2 0
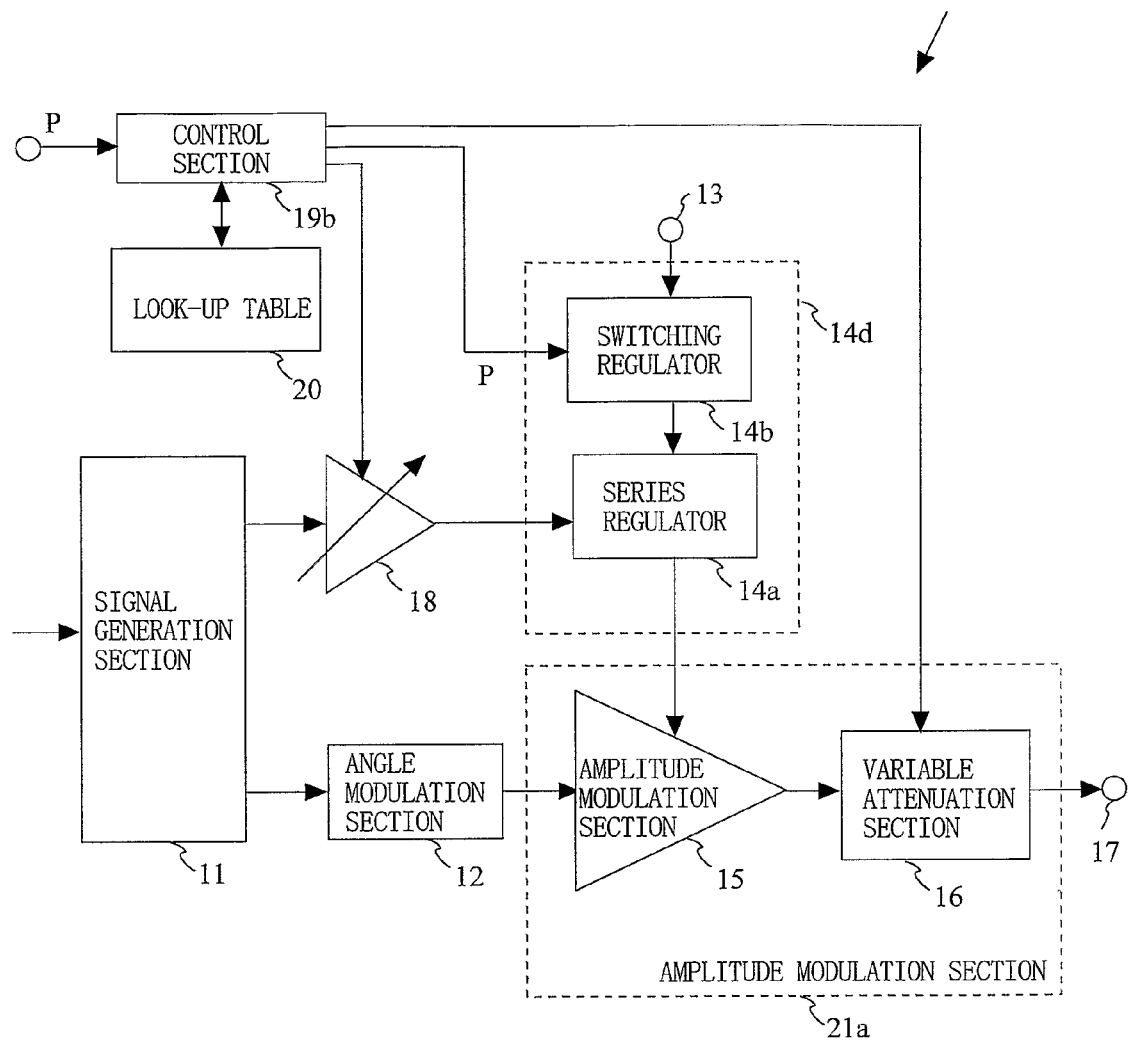

F I G. 2 2 B
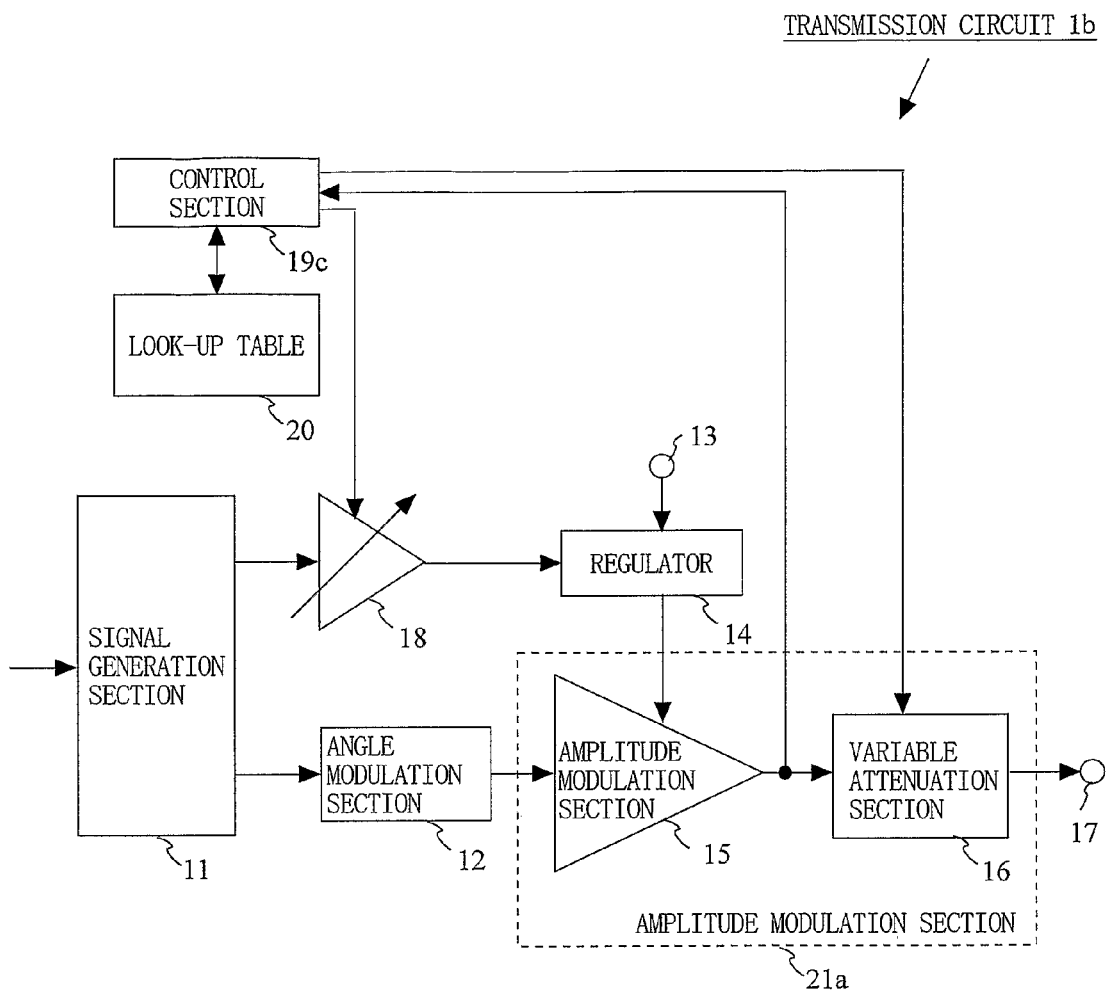

POLAR MODULATION TRANSMISSION CIRCUIT AND COMMUNICATION DEVICE

TECHNICAL FIELD

The present invention relates to a transmission circuit usable for a communication device such as, for example, a mobile phone or a wireless LAN device, and more specifically to a transmission circuit for outputting transmission signals with a low distortion and a high efficiency over a wide range of output power and a communication device using the same.

BACKGROUND ART

Conventionally, a radio frequency power amplifier for amplifying a modulated signal with a variable envelope uses a class A or class AB linear amplifier for linearly amplifying the variable envelope. Such a linear amplifier provides a superb linearity, but constantly consumes power accompanying a DC bias component and thus has a lower power efficiency than, for example, class C through class E nonlinear amplifiers. Therefore, when applied to a mobile communication device using a battery as a power source, such a radio frequency power amplifier has a problem of being usable for only a short period of time due to the high power consumption thereof. When applied to a base station device of a wireless system including a plurality of high power transmission circuits, such a radio frequency power amplifier has a problem of enlarging the device and increasing the power dissipation.

In light of these problems, a transmission circuit using a polar modulation method has been proposed as a transmission circuit operable at a high efficiency. FIG. 24 is a block diagram showing a structure of a conventional transmission circuit 500 using the polar modulation method. As shown in FIG. 24, the conventional transmission circuit 500 includes a signal generation section 501, an angle modulation section 502, a power source terminal 503, a regulator 504, an amplitude modulation section 505, and an output terminal 506.

The signal generation section 501 generates an amplitude signal and a phase signal. The amplitude signal is input to the regulator 504. The regulator 504 is supplied with a DC voltage from the power source terminal 503. The regulator 504 supplies a voltage corresponding to the input amplitude signal to the amplitude modulation section 505. The phase signal is input to the angle modulation section 502. The angle modulation section 502 performs angle modulation on the input phase signal and outputs an angle-modulated signal. The angle-modulated signal which is output from the angle modulation section 502 is input to the amplitude modulation section 505. The amplitude modulation section 505 performs amplitude modulation on the angle-modulated signal with the voltage supplied from the regulator 504, and outputs the resultant signal as a modulated signal. This modulated signal is output from the output terminal 506 as a transmission signal. In this way, the transmission circuit 500 can output transmission signals at a high efficiency.

However, a transmission signal which is output from the transmission circuit using the polar modulation method may occasionally distorted by the nonlinear characteristic of the amplitude modulation section 505 or the like. FIG. 25 shows a characteristic of the output power from the amplitude modulation section 505 with respect to the input voltage from the regulator 504. As is clear from FIG. 25, the amplitude modulation section 505 has a nonlinear area and a linear area. In order to obtain a small output power, the amplitude modulation section 505 needs to operate in the nonlinear area. When the amplitude modulation section 505 operates in such a nonlinear area, the transmission signal is undesirably distorted.

A technique for compensating for the nonlinearity of the amplitude modulation section 505 or the like in a transmission circuit using the polar modulation method has been disclosed (see, for example, U.S. Pat. No. 6,366,177). One conventional transmission circuit using such a technique is, for example, a transmission circuit 600 shown in FIG. 26. FIG. 26 is a block diagram showing an exemplary structure of the conventional transmission circuit 600. Referring to FIG. 26, a predistortion section 601 creates a predistortion table for compensating for the nonlinearity of the amplitude modulation section 505 based on a transmission signal. Then, based on the predistortion table created by the predistortion section 601, an amplitude control section 602 and a phase control section 603 respectively pre-distort an amplitude signal and a phase signal, and input the resultant signals to the regulator 504 and the amplitude modulation section 505. In this way, the transmission circuit 600 can compensate for the nonlinearity of the amplitude modulation section 505 or the like.

For a transmission circuit using the polar modulation method, a technique for putting a limitation on a small-amplitude component of an amplitude signal and thus suppressing the amplitude modulation section 505 from operating in the nonlinear area has also been proposed (see, for example, Japanese Laid-Open Patent Publication No. 2005-45782). One conventional transmission circuit using such a technique is, for example, a transmission circuit 700 shown in FIG. 27. FIG. 27 is a block diagram showing an exemplary structure of the conventional transmission circuit 700. Referring to FIG. 27, when the magnitude of an amplitude signal becomes smaller than a predetermined threshold value, an amplitude limiting section 701 shapes the waveform of the amplitude signal such that the magnitude of such a small-magnitude part of the amplitude signal is raised to the predetermined magnitude. In this way, the transmission circuit 700 can operate the amplitude modulation section 505 in the linear area even when the magnitude of the amplitude signal becomes smaller than the predetermined threshold value.

With the transmission circuit 600 shown in FIG. 26, it is difficult to compensate for the nonlinearity of the amplitude modulation section 505 because the nonlinearity easily changes in accordance with the temperature. Even when the input power to the amplitude modulation section 505 is made sufficiently low, an output signal having a power equal to or lower than a predetermined level cannot be obtained. For these reasons, the transmission circuit 600 has a problem that the nonlinearity of the amplitude modulation section 505 cannot be compensated for when the temperature of the amplitude modulation section 505 changes or when the power to be output is very low.

With the transmission circuit 700 shown in FIG. 27, a limitation is put on a small-amplitude component of the amplitude signal when the magnitude of the amplitude signal becomes smaller than the predetermined threshold value. The transmission circuit 700 has a problem that a transmission signal is distorted by putting such a limitation.

Therefore, an object of the present invention is to provide a transmission circuit for outputting transmission signals with a low distortion and a high efficiency over a wide range of output power, and a communication device using the same.

DISCLOSURE OF THE INVENTION

The present invention is directed to a transmission circuit for generating a transmission signal based on input data and outputting the transmission signal. In order to attain the object mentioned above, the transmission circuit according to the present invention comprises a signal generation section for generating an amplitude signal and a phase signal based on an amplitude component and a phase component obtained by performing signal processing on the data; a variable gain amplification section for amplifying or attenuating the amplitude signal with a controlled gain; a regulator for outputting a signal in accordance with a magnitude of the amplitude signal which is output from the variable gain amplification section; an angle modulation section for performing angle modulation on the phase signal and outputting the resultant signal as an angle-modulated signal; an amplitude modulation section for performing amplitude modulation on the angle-modulated signal with the signal which is output from the regulator into a modulated signal, attenuating the modulated signal with a controlled attenuation, and outputting the resultant signal as a transmission signal; and a control section for receiving power information representing a level of a power of a transmission signal to be output, and controlling a gain to be set in the variable gain amplification section and an attenuation to be set in the amplitude modulation section based on the power information. The control section compares a value of the power information with at least one predetermined threshold value, and determines the gain to be set in the variable gain amplification section and the attenuation to be set in the amplitude modulation section based on the comparison result.

The amplitude modulation section includes a first amplitude modulation section for performing amplitude modulation on the angle-modulated signal with the signal which is output from the regulator and outputting the resultant signal as a modulated signal; and a variable attenuation section for attenuating the modulated signal with the controlled attenuation and outputting the resultant signal as a transmission signal. When the value of the power information is smaller than the at least one predetermined threshold value, the control section sets a predetermined gain in the variable gain amplification section and sets a predetermined attenuation in the variable attenuation section.

Preferably, the transmission circuit further comprises a look-up table in which attenuations which can be set in the variable attenuation section and gains which can be set in the variable gain amplification section are registered in correspondence with values of the power information. In such a case, the attenuations which can be set in the variable attenuation section and the gains which can be set in the variable gain amplification section are in proportion to each other; and the control section determines the attenuation to be set in the variable attenuation section and the gain to be set in the variable gain amplification section based on the look-up table.

Preferably, the variable gain amplification section includes at least one amplifier for amplifying an input signal with a specific gain and outputting the resultant signal; and a plurality of switches for switching the connection of the at least one amplifier. The variable attenuation section includes at least one attenuator for attenuating an input signal with a specific attenuation and outputting the resultant signal; and a plurality of switches for switching the connection of the at least one attenuator. In such a case, the control section compares the value of the power information with the at least one predetermined threshold value, and switches the connection of the plurality of switches in the variable gain amplification section and the connection of the plurality of switches in the variable attenuation section based on the comparison result.

Preferably, the amplitude modulation section includes a first amplitude modulation section for performing amplitude modulation on the angle-modulated signal with the signal which is output from the regulator and outputting the resultant signal as a modulated signal; a second amplitude modulation section for performing amplitude modulation on the angle-modulated signal with the signal which is output from the regulator and outputting the resultant signal as a modulated signal; and a plurality of switches for switching the connection between the regulator and the first amplitude modulation section or the second amplitude modulation section. It should be noted that the second amplitude modulation section has a larger maximum output power than the first amplitude modulation section. In such a case, when the value of the power information is smaller than a predetermined threshold value, the control section increases the gain of the variable gain amplification section and switches the connection of the plurality of switches such that the first amplitude modulation section is used; and when the value of the power information is equal to or greater than the predetermined threshold value, the control section decreases the gain of the variable gain amplification section and switches the connection of the plurality of switches such that the second amplitude modulation section is used.

In this way, the transmission circuit can select a more efficient amplitude modulation section in accordance with the value of the power information, and thus can reduce the power consumption of the entire transmission circuit.

The amplitude modulation section may include a first amplitude modulation section for performing amplitude modulation on the angle-modulated signal with the signal which is output from the regulator and outputting the resultant signal as a modulated signal; a second amplitude modulation section for performing amplitude modulation on the angle-modulated signal with the signal which is output from the regulator and outputting the resultant signal as a modulated signal; a switch for switching the connection between the regulator and the first amplitude modulation section; a dividing section for dividing the angle-modulated signal for the first amplitude modulation section and the second amplitude modulation section; and a combine section for combining the modulated signal which is output from the first amplitude modulation section and the modulated signal which is output from the second amplitude modulation section, and outputting the resultant signal as a transmission signal. It should be noted that the first amplitude modulation section and the second amplitude modulation section have an equal maximum output power. In such a case, when the value of the power information is smaller than a predetermined threshold value, the control section increases the gain of the variable gain amplification section and switches the connection of the switch such that the regulator and the first amplitude modulation section are disconnected from each other; and when the value of the power information is equal to or greater than the predetermined threshold value, the control section decreases the gain of the variable gain amplification section and switches the connection of the switch such that the regulator and the first amplitude modulation section are connected to each other.

In this way, with the transmission circuit, the output from the amplitude modulation section does not become too small even at the time of small output. Therefore, the transmission circuit can output transmission signals with a low distortion and a high efficiency over a wide range of output power.

The transmission circuit may further comprise a power reuse section for converting an input signal to a power and supplying the power to the regulator. In such a case, the dividing section is a first directional coupler for equally dividing the angle-modulated signal for the first amplitude modulation section and the second amplitude modulation section. The combine section is a second directional coupler for outputting the modulated signals which are output from the first amplitude modulation section and the second amplitude modulation section in a combined form or in a divided form. When the first amplitude modulation section and the second amplitude modulation section both operate, the second directional coupler combines the modulated signals which are output from the first amplitude modulation section and the second amplitude modulation section and outputs the resultant signal as a transmission signal; and when only the second amplitude modulation section operates, the second directional coupler equally divides the modulated signal which is output from the second amplitude modulation section, and outputs one resultant signal component as a transmission signal and outputs the other resultant signal component to the power reuse section.

Preferably, the regulator is a series regulator. Owing to this, the transmission circuit can output a wide range of modulated signals.

The regulator may be a switching regulator. Owing to this, the transmission circuit can operate at a high efficiency.

The regulator may include a switching regulator and a series regulator. In such a case, the switching regulator receives the power information and supplies a voltage controlled in accordance with the power information to the series regulator. The series regulator supplies a voltage controlled in accordance with the magnitude of the amplitude signal which is output from the variable gain amplification section to the amplitude modulation section using the voltage supplied from the switching regulator. Owing to this, the transmission circuit can reduce the loss at the series regulator and thus further reduce the power consumption.

A transmission circuit according to the present invention may comprise a signal generation section for generating an amplitude signal and an angle-modulated signal based on an amplitude component and a phase component obtained by performing signal processing on the data; a variable gain amplification section for amplifying or attenuating the amplitude signal with a controlled gain; a regulator for outputting a signal in accordance with a magnitude of the amplitude signal which is output from the variable gain amplification section; an amplitude modulation section for performing amplitude modulation on the angle-modulated signal with the signal which is output from the regulator into a modulated signal, attenuating the modulated signal with a controlled attenuation, and outputting the resultant signal as a transmission signal; and a control section for receiving power information representing a level of a power of a transmission signal to be output, and controlling a gain to be set in the variable gain amplification section and an attenuation to be set in the amplitude modulation section based on the power information.

In such a case, the signal generation section includes a quadrature signal generation section for generating a baseband signal including an in-phase signal and a quadrature-phase signal, which are quadrature data, by performing signal processing on the data; a vector modulation section for performing vector modulation on the in-phase signal and the quadrature-phase signal; an envelope detection section for detecting an envelope component of the signal which is output from the vector modulation section and outputting the detected envelope component as the amplitude signal; and a limiter for limiting the envelope component of the signal which is output from the vector modulation section to a predetermined magnitude and outputting the magnitude-limited signal as the angle-modulated signal. The control section compares a value of the power information with at least one predetermined threshold value, and determines the gain to be set in the variable gain amplification section and the attenuation to be set in the amplitude modulation section based on the comparison result.

The present invention is also directed to a communication device including the above-described transmission circuit. The communication device comprises a transmission circuit for generating a transmission signal; and an antenna for outputting the transmission signal generated by the transmission circuit. The communication device may further comprise a reception circuit for processing a receiving signal received via the antenna; and an antenna duplexer for outputting the transmission signal generated by the transmission circuit to the antenna, and outputting the receiving signal received via the antenna to the reception circuit.

As described above, a transmission circuit according to the present invention can increase the output power from the amplitude modulation section by amplifying the amplitude signal by the variable gain amplification section and attenuating the modulated signal by the variable attenuation section even when the value of the power information is small. Therefore, the transmission circuit can prevent the characteristic of the amplitude modulation section from deteriorating due to the temperature change and allow the amplitude modulation section to operate in a linear area even at the time of small output. As a result, the transmission circuit can output transmission signals with a low distortion and a high efficiency over a wide range of output power.

A communication device according to the present invention can operate with a low distortion and a high efficiency over a wide range of output power by using the above-described transmission circuit.

BRIEF DESCRIPTION OF THE DRAWINGS

FIG. 1A is a block diagram showing an exemplary structure of a transmission circuit 1 according to a first embodiment of the present invention.

FIG. 4 is a block diagram showing an exemplary structure of a series regulator 14a.

FIG. 7 is a block diagram showing an exemplary structure of an amplitude modulation section 15a.

FIG. 12 is a block diagram showing an exemplary structure of a transmission circuit 3 according to a third embodiment of the present invention.

FIG. 16 is a block diagram showing an exemplary structure of a transmission circuit 4 according to a fourth embodiment of the present invention.

FIG. 17 is a block diagram showing an exemplary structure of a transmission circuit 5 according to a fifth embodiment of the present invention.

FIG. 20 is a block diagram showing an exemplary structure of a transmission circuit 6 according to a sixth embodiment of the present invention.

FIG. 21B shows an example of the output voltage from a series regulator 14a.

FIG. 22B is a block diagram showing an exemplary structure of a transmission circuit 1b.

BEST MODE FOR CARRYING OUT THE INVENTION

First Embodiment

Figure 1B:
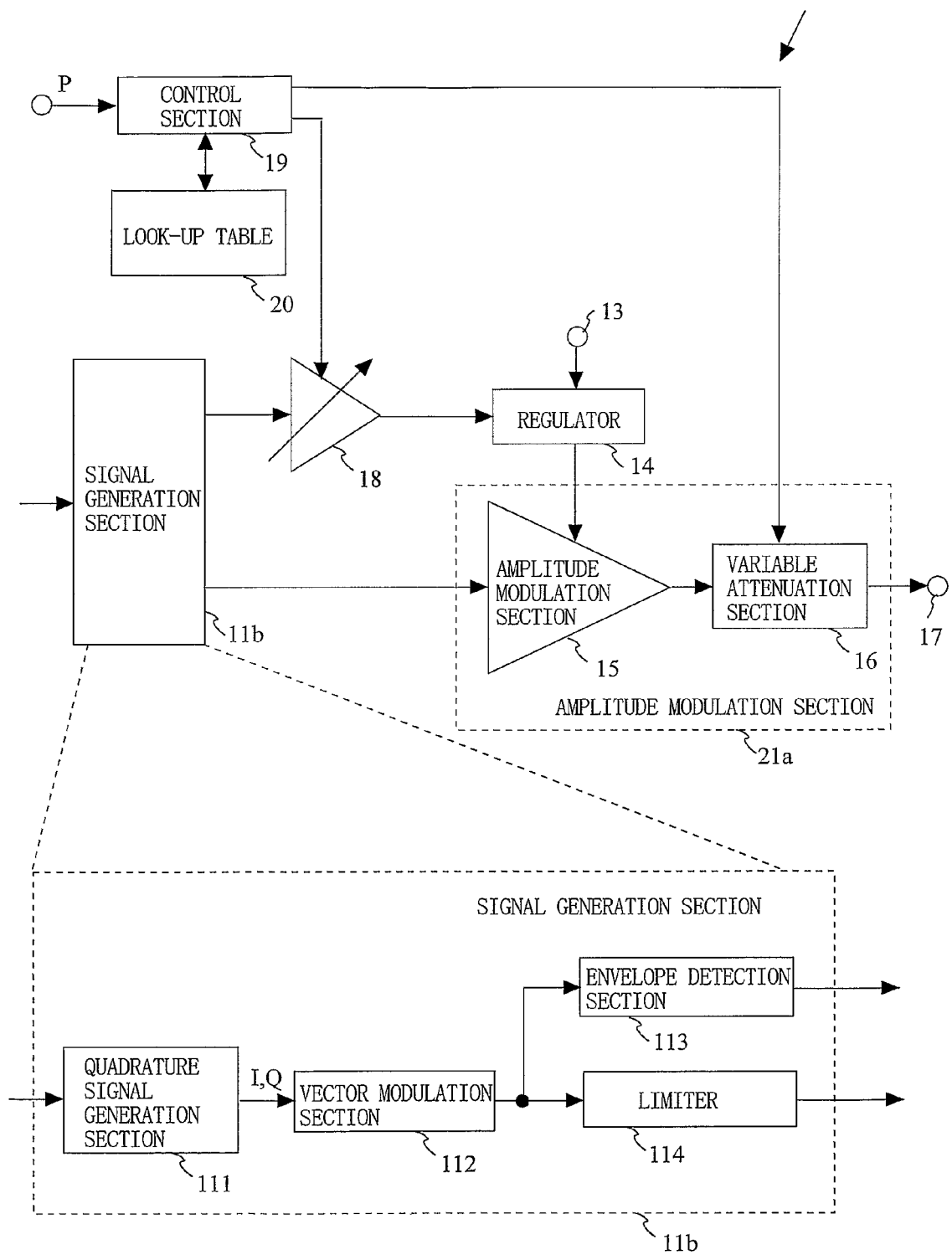
FIG. 1B is a block diagram showing an exemplary structure of a transmission circuit 1b according to the first embodiment of the present invention.

FIG. 1A is a block diagram showing an exemplary structure of a transmission circuit 1 according to a first embodiment of the present invention. As shown in FIG. 1A, the transmission circuit 1 includes a signal generation section 11, an angle modulation section 12, a power source terminal 13, a regulator 14, an amplitude modulation section 15, a variable attenuation section 16, an output terminal 17, a variable gain amplification section 18, a control section 19, and a look-up table 20.

The signal generation section 11 outputs an amplitude signal and a phase signal based on an amplitude component and a phase component obtained by performing signal processing on input data. The signal generation section 11 can include, for example, a polar coordinate signal generation section (not shown) for generating a polar coordinate signal. The polar coordinate signal generation section modulates input data and generates an amplitude signal and a phase signal, which are polar coordinate signals.

The amplitude signal is input to the regulator 14 via the variable gain amplification section 18. The regulator 14 outputs a signal controlled in accordance with the magnitude of the input amplitude signal. Typically, the regulator 14 outputs a signal in proportion to the magnitude of the input amplitude signal. The signal which is output from the regulator 14 is input to the amplitude modulation section 15. The phase signal is input to the angle modulation section 12. The angle modulation section 12 performs angle modulation on the input phase signal and outputs an angle-modulated signal. The angle-modulated signal is input to the amplitude modulation section 15. The amplitude modulation section 15 performs amplitude modulation on the angle-modulated signal with the signal input from the regulator 14, and outputs the resultant signal as a modulated signal.

The control section 19 is supplied with power information P which represents the level of the power of the transmission signal to be output. In the case of, for example, the W-CDMA system, the power information P is controlled by a base station. Namely, the power to be output is conveyed from the base station to the transmission circuit 1. Based on the power conveyed from the base station, the transmission circuit 1 determines the power information P and inputs the determined power information P to the control section 19. Based on the input power information P and the look-up table 20, the control section 19 controls the attenuation of the variable attenuation section 16 and the gain of the variable gain amplification section 18.

The variable gain amplification section 18 amplifies or attenuates the amplitude signal with the gain controlled by the control section 19, and outputs the resultant signal to the regulator 14. The modulated signal which is output from the amplitude modulation section 15 is input to the variable attenuation section 16. The variable attenuation section 16 attenuates the modulated signal with the attenuation controlled by the control section 19, and outputs the resultant signal from the output terminal 17 as a transmission signal.

Figures 2A, 2B:
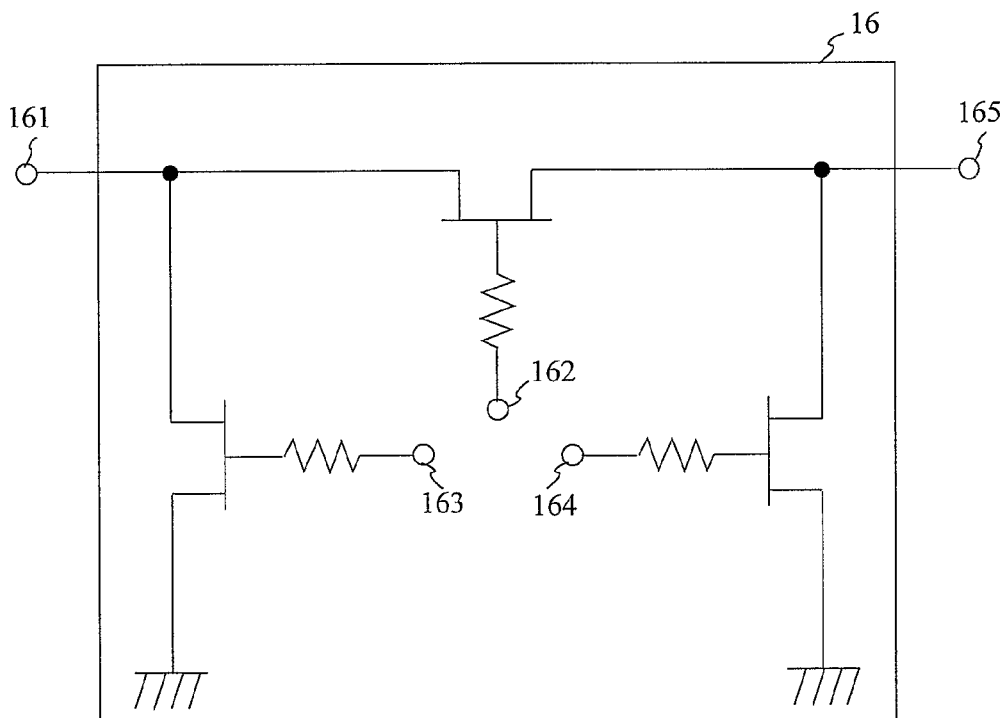
FIG. 2A shows an example of the setting of a look-up table 20.
FIG. 2B is a block diagram showing an exemplary structure of a variable attenuation section 16.

In the look-up table 20, attenuations to be set in the variable attenuation section 16 and gains to be set in the variable gain amplification section 18 are registered in correspondence with values of the power information P. FIG. 2A shows an example of the structure of the look-up table 20. As shown in FIG. 2A, attenuations Xn which can beset in the variable attenuation section 16 when the value of the power information P is smaller than a predetermined threshold value pn, and gains Yn which can be set in the variable gain amplification section 18 also when the value of the power information P is smaller than the predetermined threshold value pn, are registered in the look-up table 20. Here, n is an arbitrary natural number, and there are the relationships X1>X2> . . . >Xn, and Y1>Y2> . . . Yn. In other words, the control section 19 increases the attenuation of the variable attenuation section 16 and the gain of the variable gain amplification section 18 as the value of the power information P decreases. The attenuation Xn of the variable attenuation section 16 and the gain Yn of the variable gain amplification section 18 are ideally in proportion to each other.

In the transmission circuit 1, an assembly of the amplitude modulation section 15 and the variable attenuation section 16 may be labeled simply as an amplitude modulation section 21a. The amplitude modulation section 21a is an element for performing amplitude modulation on an angle-modulated signal with a signal output from the regulator 14 and outputting the resultant signal as a transmission signal from the output terminal 17.

The transmission circuit 1 may have a structure different from the structure shown in FIG. 1A. FIG. 1B is a block diagram showing an exemplary structure of a transmission circuit 1b according to the first embodiment of the present invention. As shown in FIG. 1B, the transmission circuit 1b includes a signal generation section 1b, a power source terminal 13, a regulator 14, an amplitude modulation section 15, a variable attenuation section 16, an output terminal 17, a variable gain amplification section 18, a control section 19, and a look-up table 20. The signal generation section 11b includes a quadrature signal generation section 111, a vector modulation section 112, an envelope detection section 113, and a limiter 114. The quadrature signal generation section 111 generates a baseband signal including an in-phase signal and a quadrature-phase signal, which are quadrature data.

The in-phase signal and the quadrature-phase signal are input to the vector modulation section 112. The vector modulation section 112 performs vector modulation on the in-phase signal and the quadrature-phase signal. As the vector modulation section 112, for example, a quadrature modulator is used. A signal which is output from the vector modulation section 112 is input to the envelope detection section 113 and the limiter 114. The envelope detection section 113 detects an envelope component of the signal output from the vector modulation section 112, and outputs the detected envelope component as an amplitude signal. The limiter 114 limits the envelope component of the signal output from the vector modulation section 112 to a certain magnitude, and outputs the magnitude-limited signal as an angle-modulated signal.

FIG. 2B is a block diagram showing an exemplary structure of the variable attenuation section 16. As shown in FIG. 2B, the variable attenuation section 16 includes an input terminal 161, a plurality of transistors, a plurality of resistors, a plurality of terminals 162 through 164, and an output terminal 165. The input terminal 161 receives a modulated signal from the amplitude modulation section 15. The input modulated signal is output from the output terminal 165 via the plurality of transistors and the plurality of resistors. The control section 19 controls the attenuation of the variable attenuation section 16 by controlling the voltage of the plurality of terminals 162 through 164.

Figure 3A:
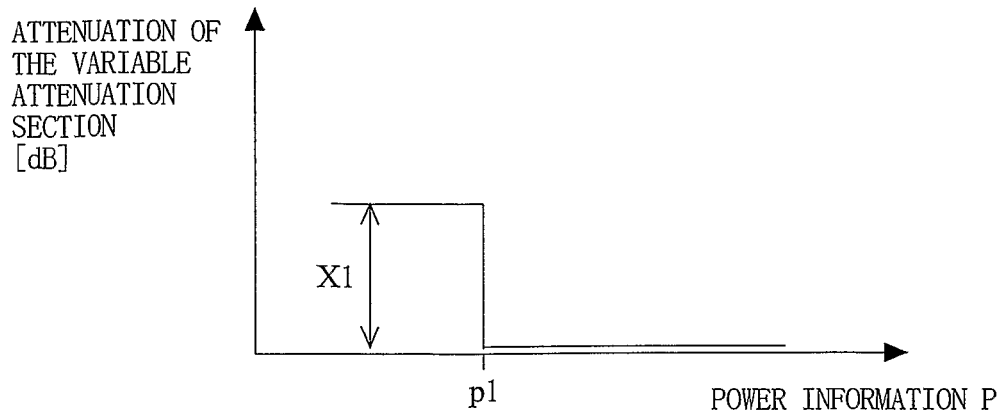
FIG. 3A shows an example of the attenuation which is set in the variable attenuation section 16 when the value of power information P changes.
Figure 3B:
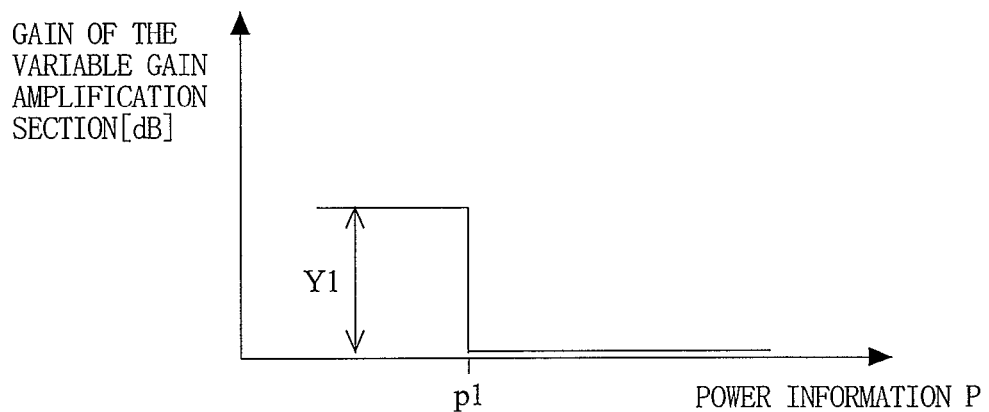
FIG. 3B shows an example of the gain which is set in a variable gain amplification section 18 when the value of the power information P changes.

FIG. 3A shows an example of the attenuation which is set in the variable attenuation section 16 when the value of the power information P changes. Referring to FIG. 3A, when the value of the power information P is smaller than a predetermined threshold value p1, the control section 19 sets the attenuation X1 in the variable attenuation section 16. FIG. 3B shows an example of the gain which is set in the variable gain amplification section 18 when the value of the power information P changes. Referring to FIG. 3B, when the value of the power information P is smaller than the predetermined threshold value p1, the control section 19 sets the gain Y1 in the variable gain amplification section 18.

Figure 3C:
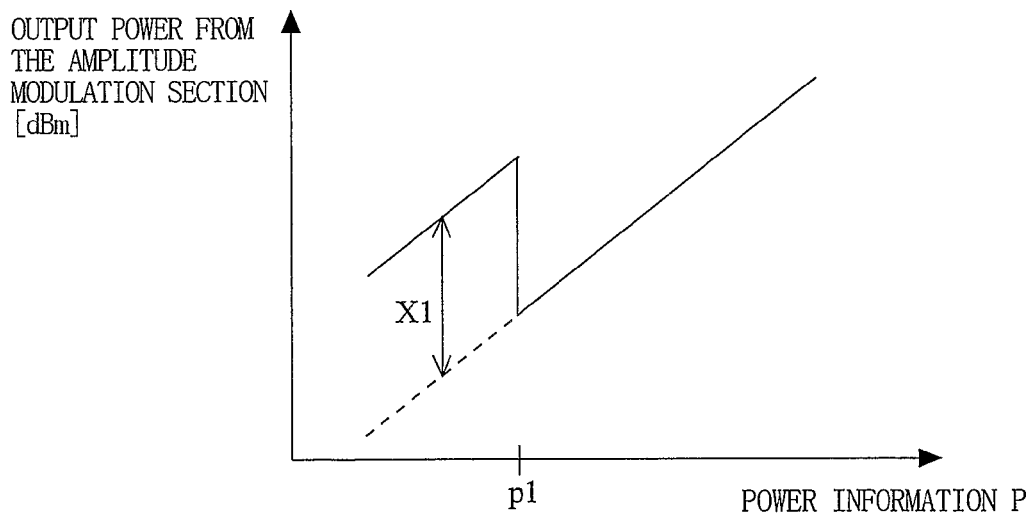
FIG. 3C shows a change in the output power from an amplitude modulation section 15 when the value of the power information P changes.

FIG. 3C shows a change in the output power from the amplitude modulation section 15 when the value of the power information P changes. Referring to FIG. 3C, when the value of the power information P is smaller than the predetermined threshold value p1, the amplitude modulation section 15 increases the output power by the attenuation X1 which is set in the variable attenuation section 16. In FIG. 3A through FIG. 3C, n=1. In this way, even when the value of the power information P is small, the transmission circuit 1 can increase the output power from the amplitude modulation section 15 by amplifying the amplitude signal by the variable gain amplification section 18 and attenuating the modulated signal by the variable attenuation section 16. Therefore, the amplitude modulation section 15 can operate in the linear area even at the time of small output.

It is known that when the output power from the amplitude modulation section 15 is small, the characteristic of the amplitude modulation section 15 is drastically deteriorated due to a temperature change in the amplitude modulation section 15. The transmission circuit 1 can prevent the characteristic deterioration of the amplitude modulation section 15 due to the temperature change by increasing the output power from the amplitude modulation section 15.

The output power from the amplitude modulation section 15 at the time of small output is not significantly larger than the output power at the time of the maximum output. Therefore, the absolute amount of the attenuation by the variable attenuation section 16 is small. For this reason, the power lost by the variable attenuation section 16 is small.

Figure 4:
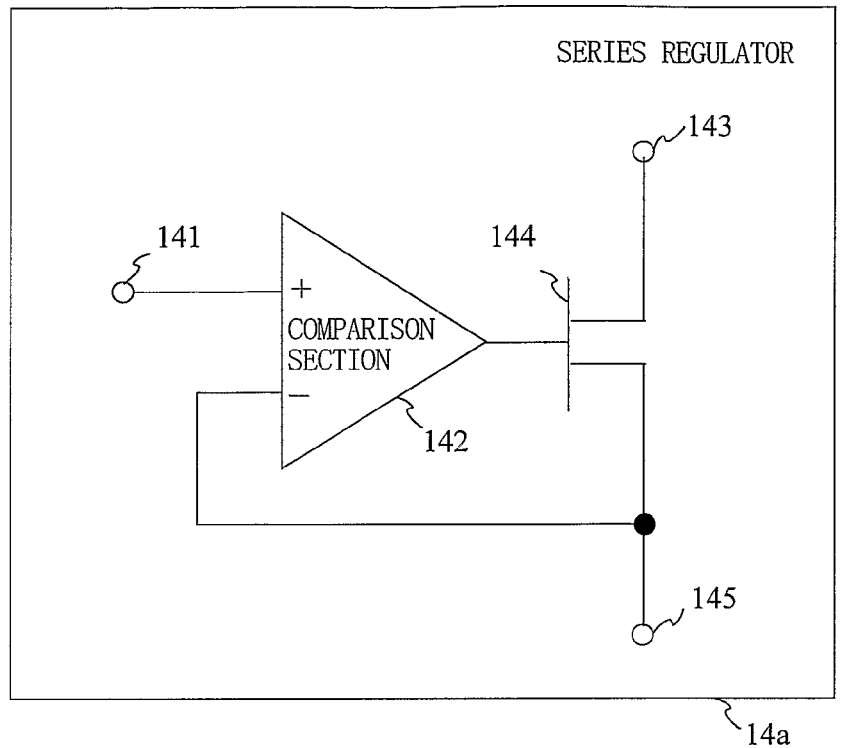

The regulator 14 may be formed of, for example, a voltage-driven type series regulator. FIG. 4 is a block diagram showing an exemplary structure of a series regulator 14a. As shown in FIG. 4, the series regulator 14a includes an input terminal 141, a comparison section 142, a power source terminal 143, a transistor 144, and an output terminal 145. In this example, the transistor 144 is a field effect transistor. The input terminal 141 receives an amplitude signal via the variable gain amplification section 18. The amplitude signal is input to a gate terminal of the transistor 144 via the comparison section 142. A drain terminal of the transistor 144 is supplied with a DC voltage from the power source terminal 143.

The transistor 144 outputs a voltage in proportion to the magnitude of the input amplitude signal from a source terminal thereof. The voltage which is output from the source terminal of the transistor 144 is fed back to the comparison section 142. Based on the fed-back voltage, the comparison section 142 adjusts the magnitude of the amplitude signal to be input to the gate terminal of the transistor 144. In this way, the series regulator 14a can stably supply a voltage controlled in accordance with the magnitude of the amplitude signal via the output terminal 145. The transistor 144 may be a bipolar transistor, in which case, substantially the same effect is provided. The transmission circuit 1 can output a wide range of modulated signals by using the series regulator 14a, which is operable in a wide range, as the regulator 14.

Figure 5:
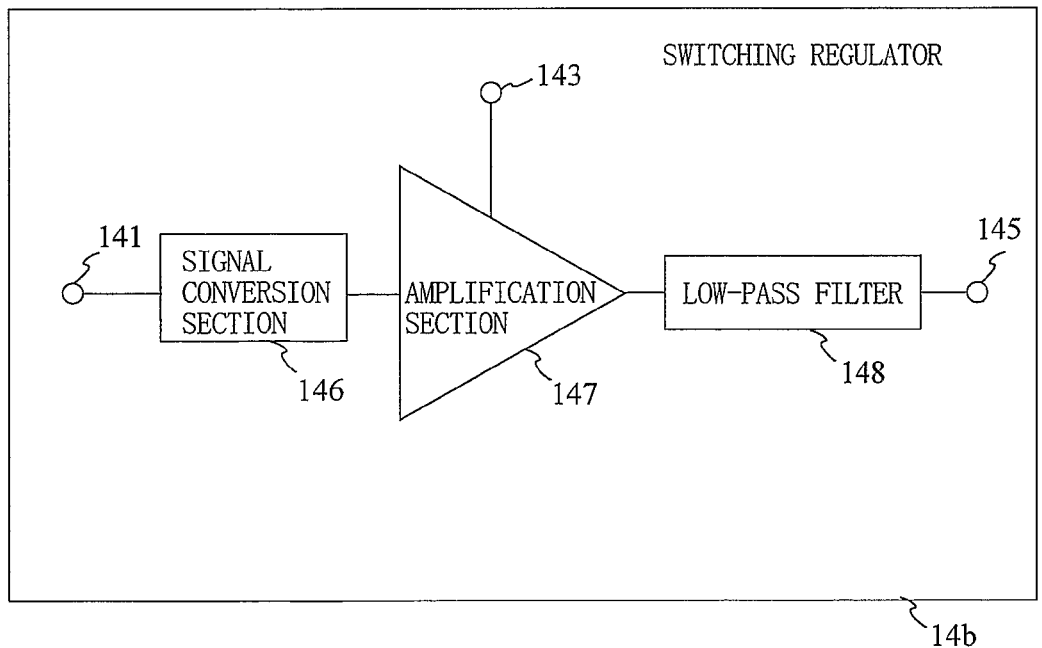
FIG. 5 is a block diagram showing an exemplary structure of a switching regulator 14b.

Alternatively, the regulator 14 may be formed of, for example, a voltage-driven type switching regulator. FIG. 5 is a block diagram showing an exemplary structure of a switching regulator 14b. As shown in FIG. 5, the switching regulator 14b includes an input terminal 141, a power source terminal 143, a signal conversion section 146, an amplification section 147, a low-pass filter 148, and an output terminal 145. The input terminal 141 receives an amplitude signal via the variable gain amplification section 18. The amplitude signal is input to the signal conversion section 146. The signal conversion section 146 converts the input amplitude signal into a PWM-modulated or delta-sigma-modulated signal. The signal converted by the signal conversion section 146 is input to the amplification section 147. The amplification section 147 amplifies and outputs the input signal. The amplification section 147 is supplied with a DC voltage from the power source terminal 143. As the amplification section 147, a highly efficient switching amplifier such as, for example, a class D amplifier, is usable.

The signal which is output from the amplification section 147 is input to the low-pass filter 148. The low-pass filter 148 removes a spurious component such as, for example, quantization noise or switching noise from the signal which is output from the amplification section 147. The signal deprived of the spurious component by the low-pass filter 148 is output via the output terminal 145 as a voltage controlled in accordance with the magnitude of the amplitude signal. The switching regulator 14b may feedback the signal output from the low-pass filter 148 to the signal conversion section 146 in order to stabilize the output voltage. The transmission circuit 1 can reduce the power consumption of the entire transmission circuit by using the highly efficient switching regulator 14b as the regulator 14.

Figure 6:
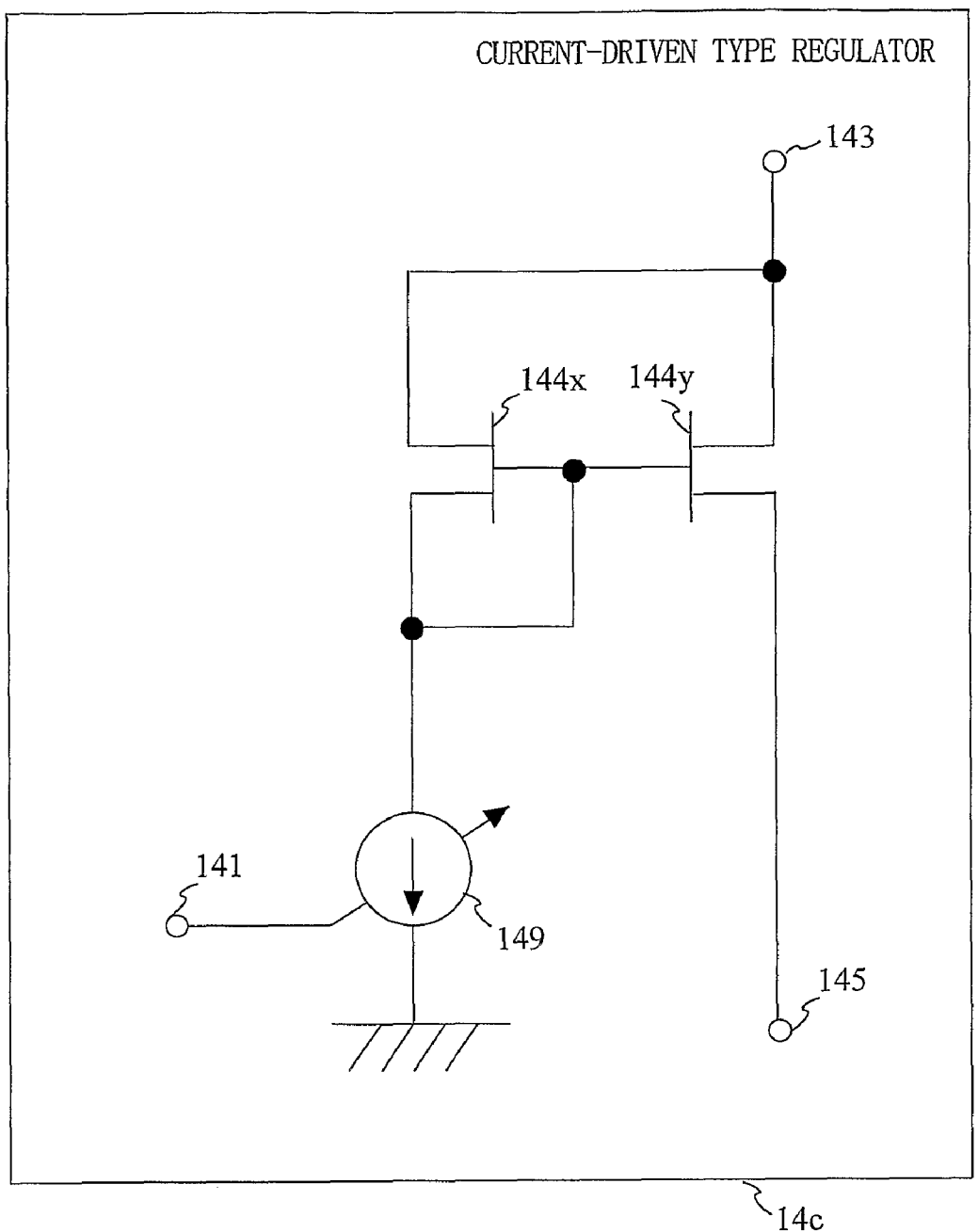
FIG. 6 is a block diagram showing an exemplary structure of a current-driven type regulator 14c.

Still alternatively, the regulator 14 may be formed of, for example, a current-driven type regulator. FIG. 6 is a block diagram showing an exemplary structure of a current-driven type regulator 14c. As shown in FIG. 6, the current-driven type regulator 14c includes an input terminal 141, a power source terminal 143, a variable current source 149, a transistor 144x, a transistor 144y, and an output terminal 145. The input terminal 141 receives an amplitude signal via the variable gain amplification section 18. The power source terminal 143 is supplied with a DC voltage. The input amplitude signal is output from the output terminal 145 via the variable current source 149, the transistor 144x and the transistor 144y as a current controlled in accordance with the magnitude of the amplitude signal. Such a current-driven type regulator 14c is useful when the amplitude modulation section 15 is formed of a bipolar transistor. The transistors 144x and 144y may each be a field effect transistor or a bipolar transistor. In either case, substantially the same effect is provided.

Figure 7:
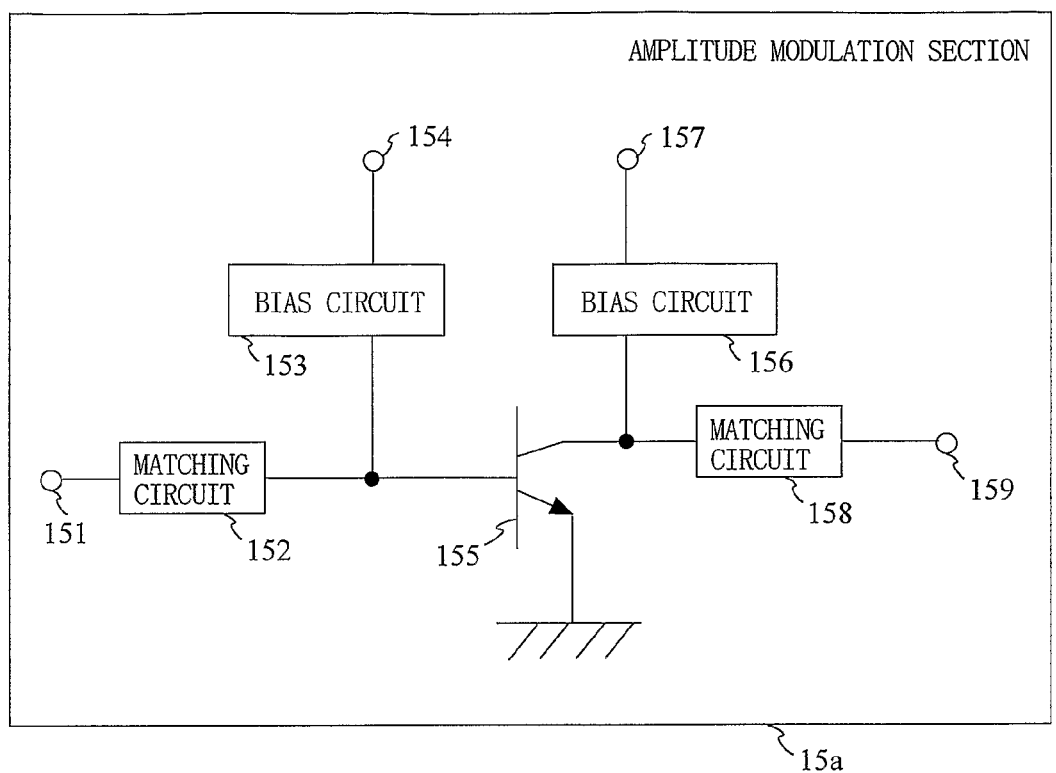

The amplitude modulation section 15 may have a structure shown in, for example, FIG. 7. FIG. 7 is a block diagram showing an exemplary structure of an amplitude modulation section 15a. As shown in FIG. 7, the amplitude modulation section 15a includes an input terminal 151, a matching circuit 152, a bias circuit 153, a power source terminal 154, a transistor 155, a bias circuit 156, an input terminal 157, a matching circuit 158, and an output terminal 159. In this example, the transistor 155 is a bipolar transistor. The input terminal 151 receives an angle-modulated signal from the angle modulation section 12. The angle-modulated signal is input to a base terminal of the transistor 155 via the matching circuit 152.

The power source terminal 154 is supplied with a DC voltage. In other words, the base terminal of the transistor 155 is supplied with a bias voltage via the power source terminal 154 and the bias circuit 153. The input terminal 157 receives a signal controlled in accordance with the magnitude of the amplitude signal which is output from the regulator 14. The signal controlled in accordance with the magnitude of the amplitude signal is input to a collector terminal of the transistor 155 via the bias circuit 156. The transistor 155 performs amplitude modulation on the angle-modulated signal with the signal controlled in accordance with the magnitude of the amplitude signal, and outputs the resultant signal as a modulated signal.

The modulated signal which is output from the transistor 155 is output from the output terminal 159 via the matching circuit 158. The transistor 155 may be a field effect transistor, in which case, substantially the same effect is provided. In the amplitude modulation section 15a, the signal input to the power source terminal 154 and the signal input to the input terminal 157 may be exchanged. In this case also; substantially the same effect is provided.

Figure 8:
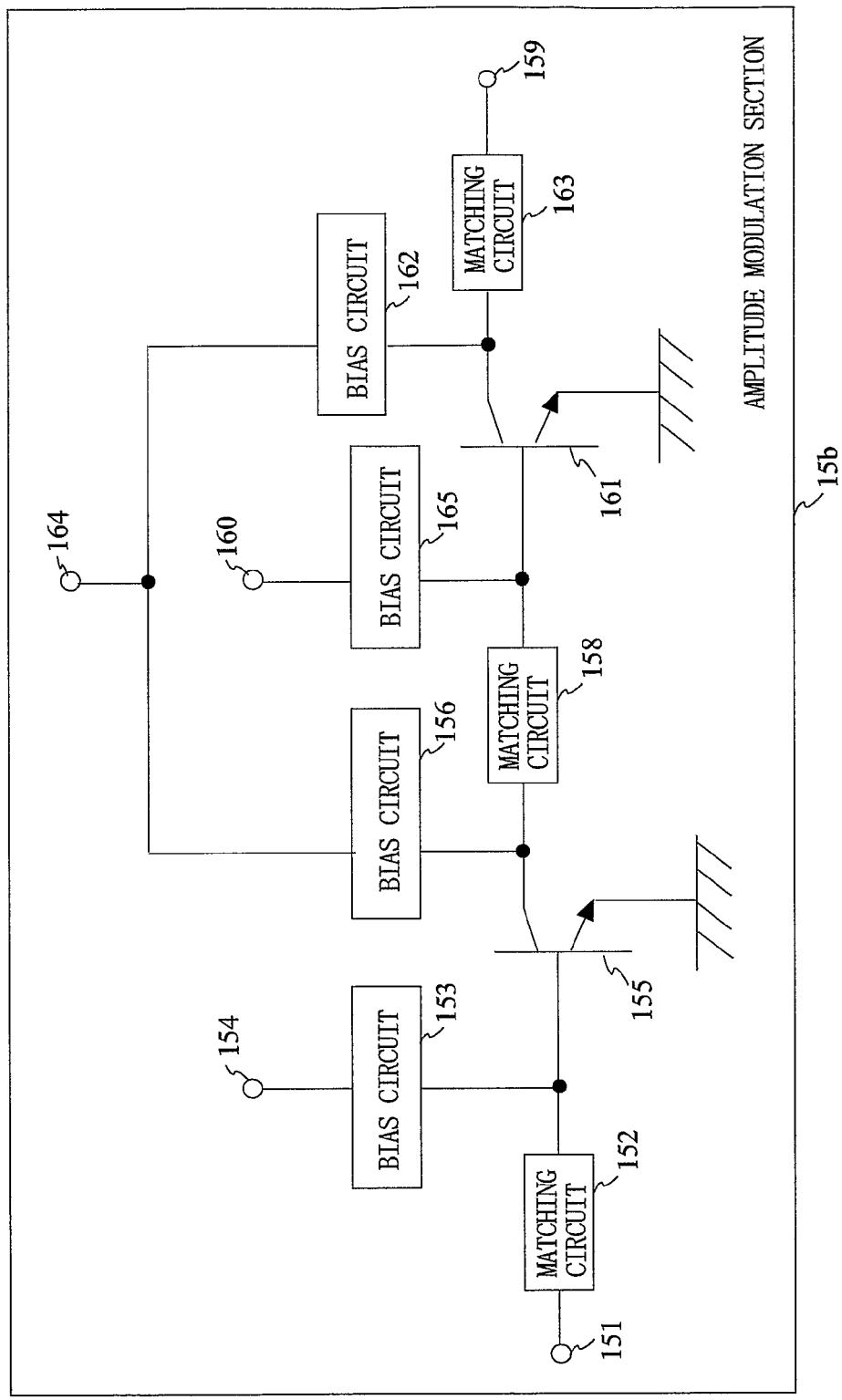
FIG. 8 is a block diagram showing an exemplary structure of an amplitude modulation section 15b.

The amplitude modulation section 15 may have a structure different from the above-described structure of the amplitude modulation section 15a. FIG. 8 is a block diagram showing an exemplary structure of an amplitude modulation section 15b. As shown in FIG. 8, the amplitude modulation section 15b basically has a structure obtained as a result of connecting two amplitude modulation sections 15a (see FIG. 7) in series. A base terminal of a transistor 155 is supplied with a bias voltage from a power source terminal 154 via a bias circuit 153. A base terminal of a transistor 161 is supplied with a bias voltage from a power source terminal 160 via a bias circuit 165.

A collector terminal of the transistor 155 receives a signal controlled in accordance with the magnitude of an amplitude signal from the regulator 14 via a terminal 164 and a bias circuit 156. A collector terminal of the transistor 161 receives a signal controlled in accordance with the magnitude of an amplitude signal from the regulator 14 via the terminal 164 and a bias circuit 162. Owing to such a structure, the amplitude modulation section 15b can output a signal having a wider dynamic range than the amplitude modulation section 15a shown in FIG. 7. In the amplitude modulation sections 15a and 15b, the transistors are bipolar transistors. The transistors may be field effect transistors, in which case, substantially the same effect is provided.

As described above, the transmission circuit 1 according to the first embodiment of the present invention can increase the output power from the amplitude modulation section 15 by amplifying the amplitude signal by the variable gain amplification section 18 and attenuating the modulated signal by the variable attenuation section 16 even when the value of the power information P is small. Therefore, the transmission circuit 1 can prevent the characteristic of the amplitude modulation section 15 from deteriorating due to the temperature change and allow the amplitude modulation section 15 to operate in the linear area even at the time of small output. As a result, the transmission circuit 1 can output transmission signals with a low distortion and a high efficiency over a wide range of output power.

Second Embodiment

Figure 9:
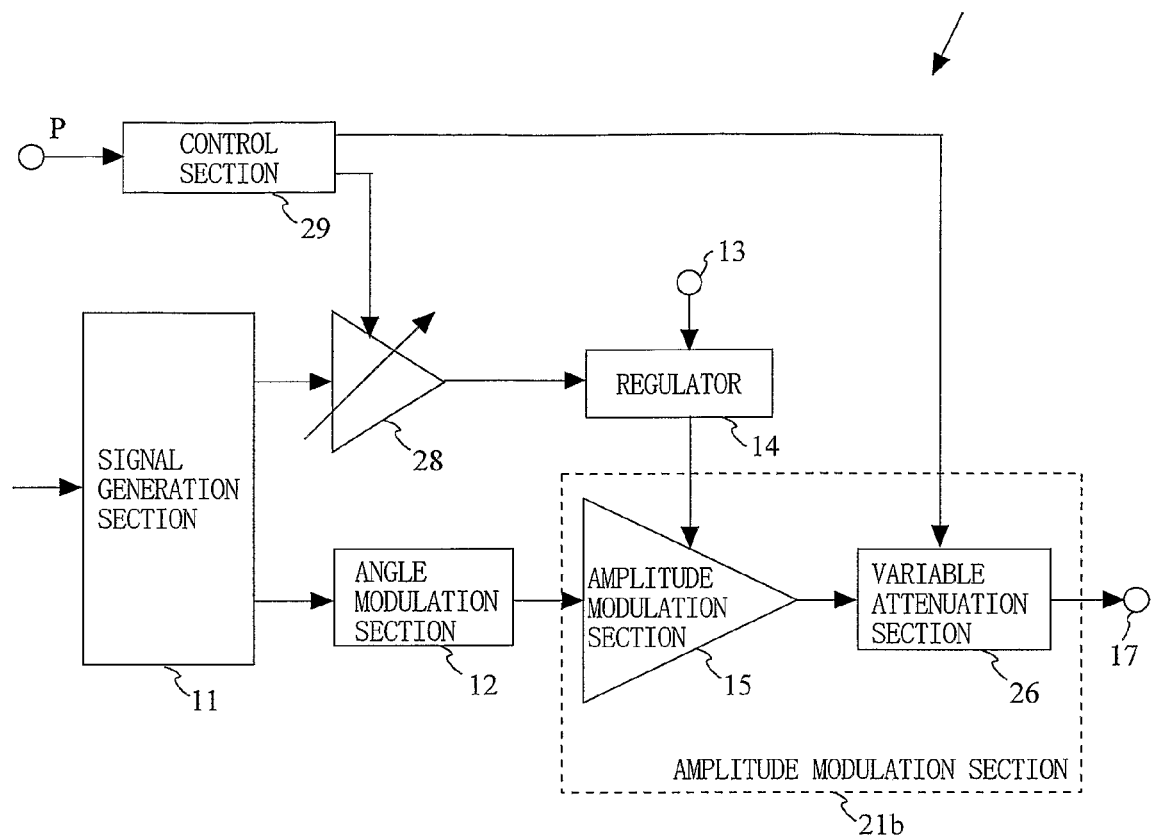
FIG. 9 is a block diagram showing an exemplary structure of a transmission circuit 2 according to a second embodiment of the present invention.

FIG. 9 is a block diagram showing an exemplary structure of a transmission circuit 2 according to a second embodiment of the present invention. As shown in FIG. 9, the transmission circuit 2 includes a signal generation section 11, an angle modulation section 12, a power source terminal 13, a regulator 14, an amplitude modulation section 15, a variable attenuation section 26, an output terminal 17, a variable gain amplification section 28, and a control section 29. In the transmission circuit 2 according to the second embodiment, the variable attenuation section 26, the variable gain amplification section 28 and the control section 29 operate in a different manner from those of the transmission circuit 1 according to the first embodiment.

In the transmission circuit 2, an assembly of the amplitude modulation section 15 and the variable attenuation section 26 may be labeled simply as an amplitude modulation section 21b, like in the transmission circuit 1.

Figure 10:
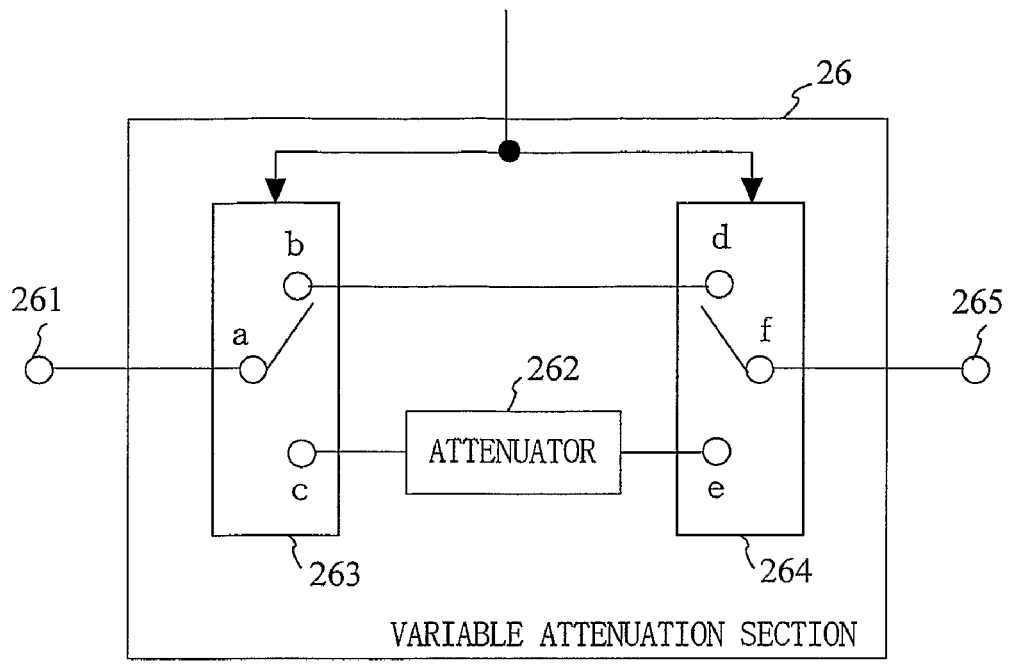
FIG. 10 is a block diagram showing an exemplary structure of a variable attenuation section 26.
Figure 26:
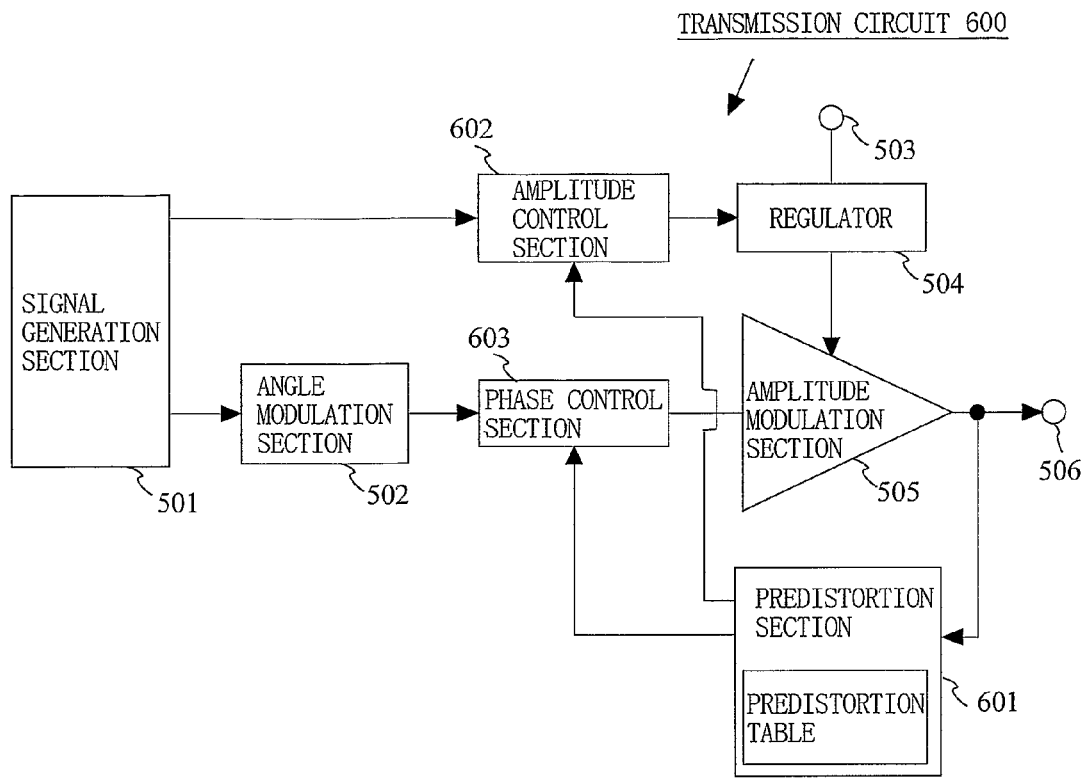
FIG. 26 is a block diagram showing an exemplary structure of a conventional transmission circuit 600.
Figure 27:
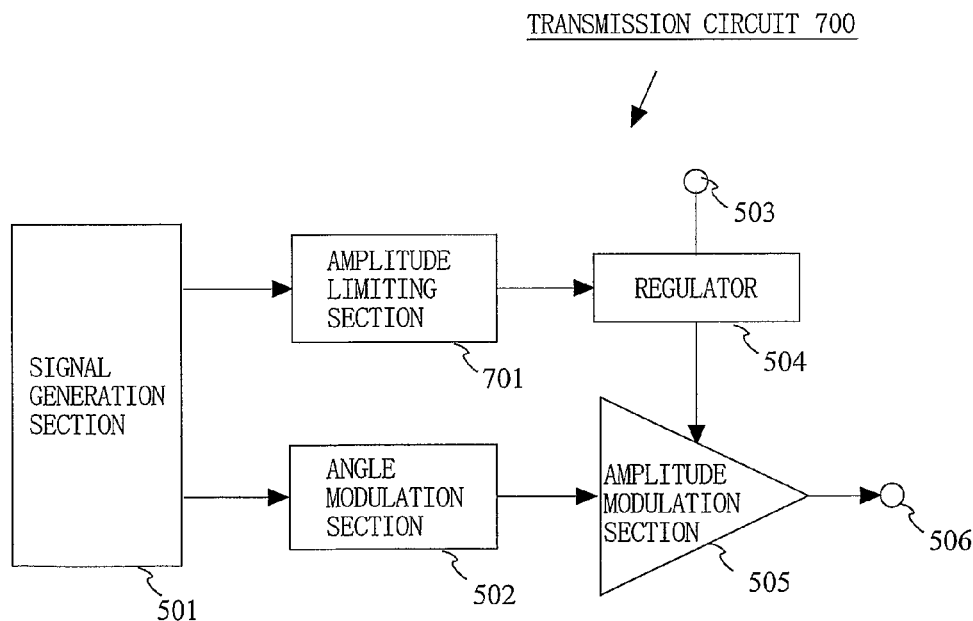
FIG. 27 is a block diagram showing an exemplary structure of a conventional transmission circuit 700.

FIG. 10 is a block diagram showing an exemplary structure of the variable attenuation section 26. As shown in FIG. 26, the variable attenuation section 26 includes an input terminal 261, an attenuator 262, a first switch 263, a second switch 264, and an output terminal 265. The input terminal 261 receives a modulated signal from the amplitude modulation section 15. The connection between terminals of the first switch 263 and the second switch 264 is switched in accordance with the control of the control section 29. The attenuator 262 attenuates the input modulated signal by a predetermined attenuation X1 and outputs the resultant signal.

Figure 11:
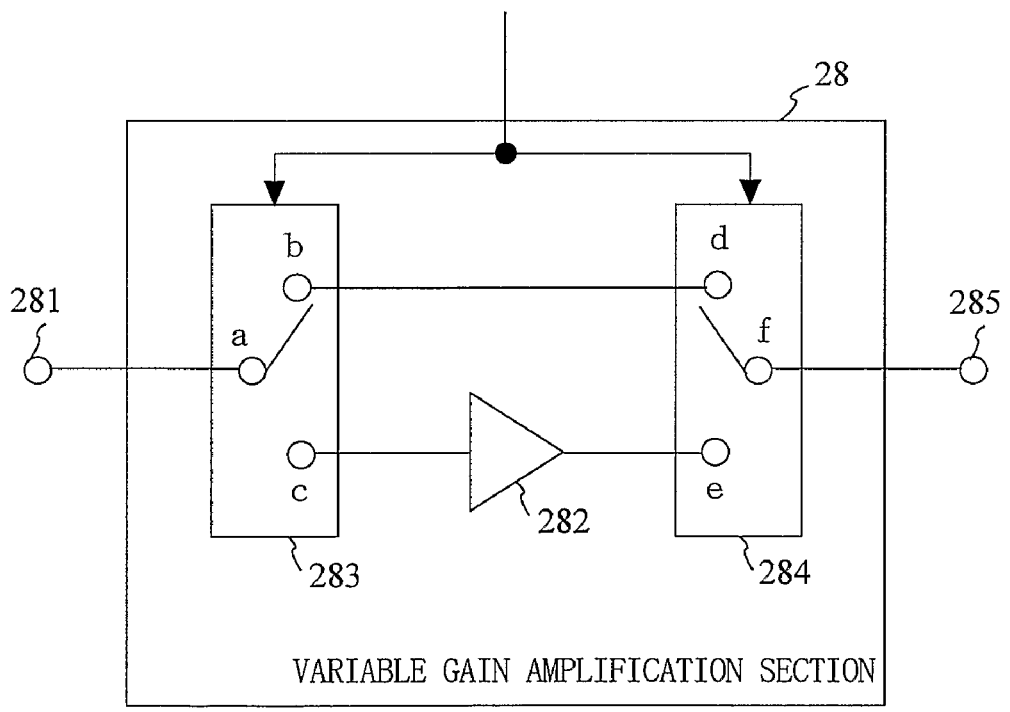
FIG. 11 is a block diagram showing an exemplary structure of a variable gain amplification section 28.

FIG. 11 is a block diagram showing an exemplary structure of the variable gain amplification section 28. As shown in FIG. 11, the variable gain amplification section 28 includes an input terminal 281, an amplifier 281, a first switch 283, a second switch 284, and an output terminal 285. The input terminal 281 receives an amplitude signal from the signal generation section 11. The connection between terminals of the first switch 283 and the second switch 284 is switched in accordance with the control of the control section 29. The amplifier 282 amplifies the input amplitude signal by a predetermined gain Y1 and outputs the resultant signal.

The control section 29 controls the variable attenuation section 26 and the variable gain amplification section 28 in accordance with the value of the power information P. Specifically, when the value of the power information P is equal to or greater than a predetermined threshold value p1, the control section 29 controls the variable attenuation section 26 such that a terminal a and a terminal b of the first switch 263 are connected to each other and a terminal d and a terminal f of the second switch 264 are connected to each other. At the same time, the control section 29 controls the variable gain amplification section 28 such that a terminal a and a terminal b of the first switch 283 are connected to each other and a terminal d and a terminal f of the second switch 284 are connected to each other.

Namely, when the value of the power information P is equal to or greater than the predetermined threshold value p1, in the variable attenuation section 26, the modulated signal which is input to the input terminal 261 is output from the output terminal 265 via the terminals a, b, d and f. In the variable gain amplification section 28, the amplitude signal which is input to the input terminal 281 is output from the output terminal 285 via the terminals a, b, d and f.

When the value of the power information P is smaller than the predetermined threshold value p1, the control section 29 controls the variable attenuation section 26 such that the terminal a and a terminal c of the first switch 263 are connected to each other and a terminal e and the terminal f of the second switch 264 are connected to each other. At the same time, the control section 29 controls the variable gain amplification section 28 such that the terminal a and a terminal c of the first switch 283 are connected to each other and a terminal e and the terminal f of the second switch 284 are connected to each other.

Namely, when the value of the power information P is smaller than the predetermined threshold value p1, in the variable attenuation section 26, the modulated signal which is input to the input terminal 261 is output from the output terminal 265 via the terminals a and c, the attenuator 262, and the terminals e and f. In the variable gain amplification section 28, the amplitude signal which is input to the input terminal 281 is output from the output terminal 285 via the terminals a and c, the amplifier 282, and the terminals e and f.

The attenuation which is set in the variable attenuation section 26 when the value of the power information P changes is substantially the same as described above with reference to FIG. 3A. The gain which is set in the variable gain amplification section 28 when the value of the power information P changes is substantially the same as described above with reference to FIG. 3B. The output power from the amplitude modulation section 15 when the value of the power information P changes is substantially the same as described above with reference to FIG. 3C.

As described above, like in the first embodiment, the transmission circuit 2 according to the second embodiment of the present invention can increase the output power from the amplitude modulation section 15 by amplifying the amplitude signal by the variable gain amplification section 28 and attenuating the modulated signal by the variable attenuation section 26 even when the value of the power information P is small. Therefore, the transmission circuit 2 can prevent the characteristic of the amplitude modulation section 15 from deteriorating due to the temperature change and allow the amplitude modulation section 15 to operate in the linear area even at the time of small output. As a result, the transmission circuit 2 can output transmission signals with a low distortion and a high efficiency over a wide range of output power.

Third Embodiment

FIG. 12 is a block diagram showing an exemplary structure of a transmission circuit 3 according to a third embodiment of the present invention. Referring to FIG. 12, in the transmission circuit 3, a variable attenuation section 26b, a variable gain amplification section 28b, and a control section 29b operate in a different manner from those in the transmission circuit 2 according to the second embodiment. In the third embodiment, the variable attenuation section 26b can switch the attenuation by values greater than binary values. The variable gain amplification section 28b can switch the gain by values greater than binary values.

In the transmission circuit 3, an assembly of the amplitude modulation section 15 and the variable attenuation section 26b may be labeled simply as an amplitude modulation section 21c, like in the transmission circuit 1.

Figure 13:
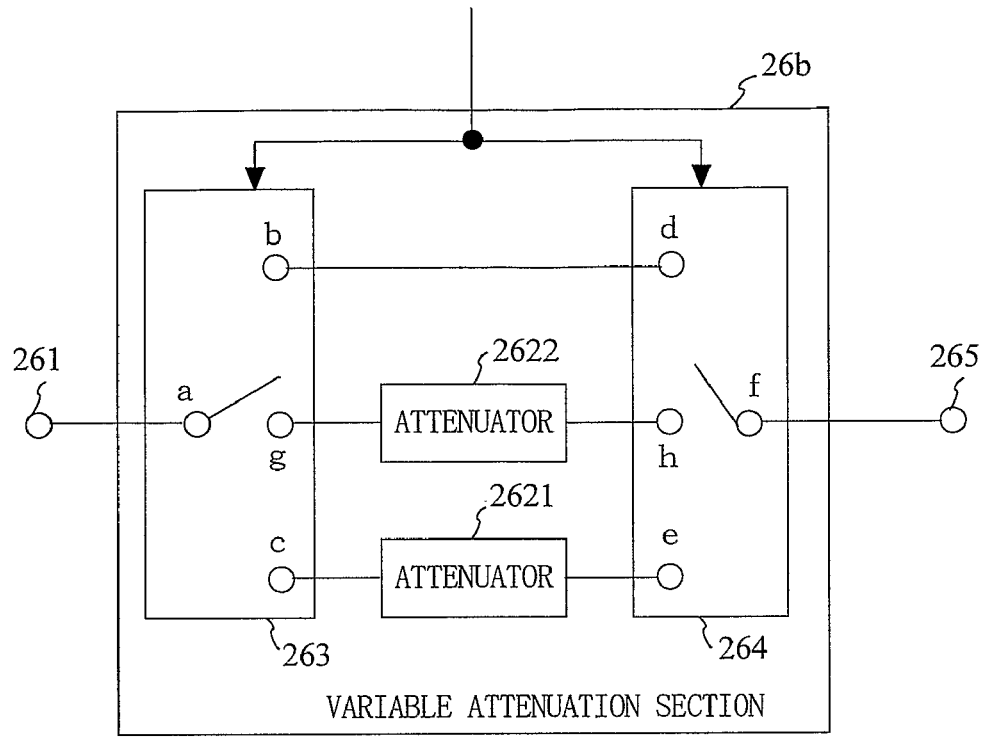
FIG. 13 is a block diagram showing an exemplary structure of a variable attenuation section 26b capable of switching the attenuation by ternary values.

FIG. 13 is a block diagram showing an exemplary structure of the variable attenuation section 26b capable of switching the attenuation by ternary values. As shown in FIG. 13, the variable attenuation section 26b includes an input terminal 261, a first attenuator 2621, a second attenuator 2622, a first switch 263, a second switch 264, and an output terminal 265. The first attenuator 2621 attenuates the input modulated signal by a predetermined attenuation X1 and outputs the resultant signal. The second attenuator 2622 attenuates the input modulated signal by a predetermined attenuation X2 and outputs the resultant signal. It should be noted that X1>X2.

Figure 14:
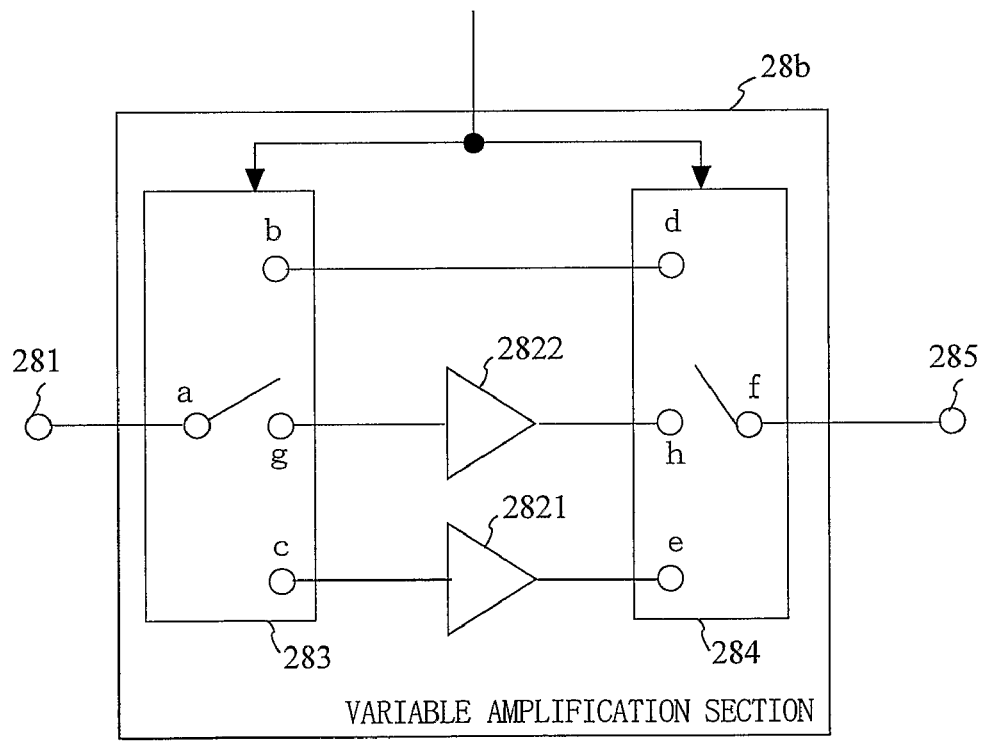
FIG. 14 is a block diagram showing an exemplary structure of a variable gain amplification section 28b capable of switching the gain by ternary values.

FIG. 14 is a block diagram showing an exemplary structure of the variable gain amplification section 28b capable of switching the gain by ternary values. As shown in FIG. 14, the variable gain amplification section 28b includes an input terminal 281, a first amplifier 2821, a second amplifier 2822, a first switch 283, a second switch 284, and an output terminal 285. The first amplifier 2821 amplifies the input amplitude signal by a predetermined gain Y1 and outputs the resultant signal. The second amplifier 2822 amplifies the input amplitude signal by a predetermined gain Y2 and outputs the resultant signal. It should be noted that Y1>Y2.

The control section 29b compares the value of the input power information P with each of two predetermined threshold values p1 and p2, and controls the variable attenuation section 26b and the variable gain amplification section 28b based on the comparison result. It should be noted that p1<p2. Specifically, when the value of the power information P is equal to or greater than the predetermined threshold value p2, the control section 29 controls the variable attenuation section 26b such that a terminal a and a terminal b of the first switch 263 are connected to each other and a terminal d and a terminal f of the second switch 264 are connected to each other. At the same time, the control section 29b controls the variable gain amplification section 28b such that a terminal a and a terminal b of the first switch 283 are connected to each other and a terminal d and a terminal f of the second switch 284 are connected to each other.

Namely, when the value of the power information P is equal to or greater than the predetermined threshold value p2, in the variable attenuation section 26b, the modulated signal which is input to the input terminal 261 is output from the output terminal 265 via the terminals a, b, d and f. In the variable gain amplification section 28b, the amplitude signal which is input to the input terminal 281 is output from the output terminal 285 via the terminals a, b, d and f.

When the value of the power information P is equal to or greater than the predetermined threshold value p1 and smaller than the predetermined threshold value p2, the control section 29b controls the variable attenuation section 26b such that the terminal a and a terminal g of the first switch 263 are connected to each other and a terminal h and the terminal f of the second switch 264 are connected to each other. At the same time, the control section 29b controls the variable gain amplification section 28b such that the terminal a and a terminal g of the first switch 283 are connected to each other and a terminal h and the terminal f of the second switch 284 are connected to each other.

Namely, when the value of the power information P is equal to or greater than the predetermined threshold value p1 and smaller than the predetermined threshold value p2, in the variable attenuation section 26b, the modulated signal which is input to the input terminal 261 is output from the output terminal 265 via the terminals a and g, the second attenuator 2622, and the terminals h and f. In the variable gain amplification section 28b, the amplitude signal which is input to the input terminal 281 is output from the output terminal 285 via the terminals a and g, the second amplifier 2822, and the terminals h and f.

When the value of the power information P is smaller than the predetermined threshold value p1, the control section 29b controls the variable attenuation section 26b such that the terminal a and a terminal c of the first switch 263 are connected to each other and a terminal e and the terminal f of the second switch 264 are connected to each other. At the same time, the control section 29b controls the variable gain amplification section 28b such that the terminal a and a terminal c of the first switch 283 are connected to each other and a terminal e and the terminal f of the second switch 284 are connected to each other.

Namely, when the value of the power information P is smaller than the predetermined threshold value p1, in the variable attenuation section 26b, the modulated signal which is input to the input terminal 261 is output from the output terminal 265 via the terminals a and c, the first attenuator 2621, and the terminals e and f. In the variable gain amplification section 28b, the amplitude signal which is input to the input terminal 281 is output from the output terminal 285 via the terminals a and c, the first amplifier 2821, and the terminals e and f.

Figure 15A:
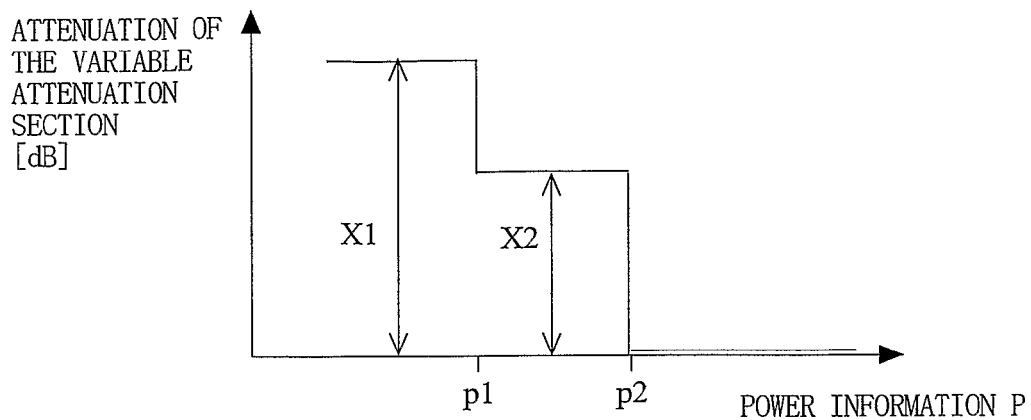
FIG. 15A shows an example of the attenuation which is set in the variable attenuation section 26b when the value of the power information P changes.

FIG. 15A shows an example of the attenuation which is set in the variable attenuation section 26b when the value of the power information P changes. Referring to FIG. 15A, when the value of the power information P is equal to or greater than the predetermined threshold value p1 and smaller than the predetermined threshold value p2, the control section 29b sets the attenuation X2 in the variable attenuation section 26b. When the value of the power information P is smaller than the predetermined threshold value p1, the control section 29b sets the attenuation X1 in the variable attenuation section 26b.

Figure 15B:
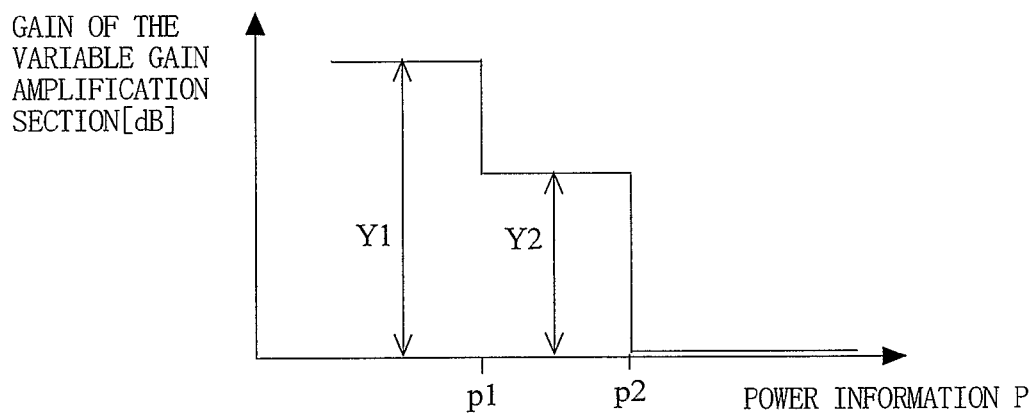
FIG. 15B shows an example of the gain which is set in the variable gain amplification section 28b when the value of the power information P changes.

FIG. 15B shows an example of the gain which is set in the variable gain amplification section 28b when the value of the power information P changes. Referring to FIG. 15B, when the value of the power information P is equal to or greater than the predetermined threshold value p1 and smaller than the predetermined threshold value p2, the control section 29b sets the gain Y2 in the variable gain amplification section 28b. When the value of the power information P is smaller than the predetermined threshold value p1, the control section 29b sets the gain Y1 in the variable gain amplification section 28b.

Figure 15C:
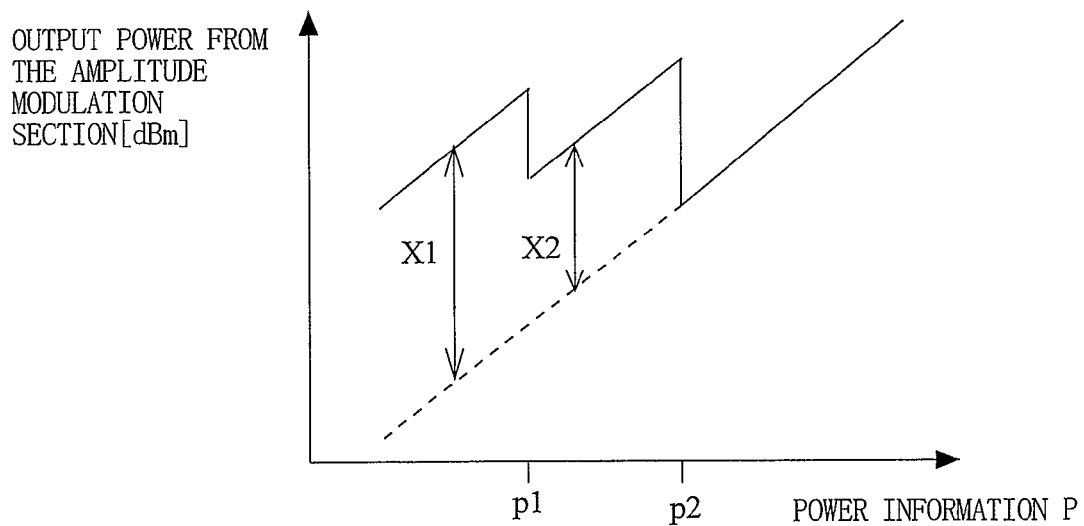
FIG. 15C shows a change in the output power from the amplitude modulation section 15 when the value of the power information P changes.

FIG. 15C shows a change in the output power from the amplitude modulation section 15 when the value of the power information P changes. Referring to FIG. 15C, when the value of the power information P is equal to or greater than the predetermined threshold value p1 and smaller than the predetermined threshold value p2, the amplitude modulation section 15 increases the output power by the attenuation X2 which is set in the variable attenuation section 26b. When the value of the power information P is smaller than the predetermined threshold value p1, the amplitude modulation section 15 increases the output power by the attenuation X1 which is set in the variable attenuation section 26b. It is appreciated from FIG. 15C that when the value of the power information P is equal to or greater than the predetermined threshold value p1 and smaller than the predetermined threshold value p2, the output power from the amplitude modulation section 15 is smaller than that shown in FIG. 3C.

As described above, the transmission circuit 3 according to the third embodiment of the present invention switches the attenuation of the variable attenuation section 26b and the gain of the variable gain amplification section 28b by values more than binary values in accordance with the value of the power information P, and thus can reduce the power consumption as compared with the transmission circuit 2 according to the second embodiment. As a result, the transmission circuit 3 can output transmission signals with a low distortion and a high efficiency over a wide range of output power.

Fourth Embodiment

FIG. 16 is a block diagram showing an exemplary structure of a transmission circuit 4 according to a fourth embodiment of the present invention. As shown in FIG. 16, the transmission circuit 4 includes a signal generation section 11, an angle modulation section 12, a power source terminal 13, a regulator 14, a first amplitude modulation section 451, a second amplitude modulation section 452, an output terminal 17, a variable gain amplification section 28, a control section 29, a first switch 41, a second switch 42, and a third switch 43.

In the transmission circuit 4, an assembly of the first amplitude modulation section 451, the second amplitude modulation section 452, the first switch 41, the second switch 42 and the third switch 43 may be labeled simply as an amplitude modulation section 21d. The amplitude modulation section 21d is an element for performing amplitude modulation on an angle-modulated signal with a signal output from the regulator 14 and outputting the resultant signal as a transmission signal from the output terminal 17.

The first amplitude modulation section 451 and the second amplitude modulation section 452 each perform amplitude modulation on an angle-modulated signal which is input from the angle modulation section 12 with a signal supplied from the regulator 14, and output the resultant signal as a modulated signal. In this example, the second amplitude modulation section 452 has a larger transistor size than the first amplitude modulation section 451. Namely, the second amplitude modulation section 452 has a larger maximum output power than the first amplitude modulation section 451. The first amplitude modulation section 451 and the second amplitude modulation section 452 have a structure substantially the same as that shown in FIG. 7 or FIG. 8.

The control section 49 controls the variable gain amplification section 28 and also switches the connection of the first switch 41, the second switch 42 and the third switch 43, in accordance with the value of the power information P. Specifically, when the value of the power information P is smaller than a predetermined threshold value, the control section 49 increases the gain of the variable gain amplification section 28 and switches the connection of the first through third switches 41 through 43 such that the first amplitude modulation section 451 is used.

When the value of the power information P is equal to or greater than the predetermined threshold value, the control section 49 decreases the gain of the variable gain amplification section 28 and switches the connection of the first through third switches 41 through 43 such that the second amplitude modulation section 452 is used. In this way, the transmission circuit 4 can select a more efficient amplitude modulation section in accordance with the value of the power information P, and thus can reduce the power consumption of the entire transmission circuit.

When the value of the power information P is equal to or greater than the predetermined threshold value, the control section 49 may decrease the gain of the variable gain amplification section 28 to zero. The control section 49 may turn off either the first amplitude modulation section 451 or the second amplitude modulation section 452 which is not in use. In this way, the transmission circuit 4 can stop an unnecessary transistor operation and thus further reduce the power consumption.

The control section 49 may control the variable gain amplification section 28 and switch the connection of the first, second and third switches 41, 42 and 43, in accordance with the modulation mode of the transmission circuit 4 instead of the value of the power information P. For example, it is assumed that the transmission circuit 4 uses, as modulation modes, UMTS for controlling the range of −50 dBm to 24 dBm and GSM/EDGE for controlling the range of 5 dBm to 33 dBm. In this case, when the modulation mode is UMTS, the control section 49 increases the gain of the variable gain amplification section 28 and switches the connection of the first through third switches 41 through 43 such that the first amplitude modulation section 451 is used. When the modulation mode is GSM/EDGE, the control section 49 decreases the gain of the variable gain amplification section 28 and switches the connection of the first through third switches 41 through 43 such that the second amplitude modulation section 452 is used.

The transmission circuit 4 may not include the first through third switches 41 through 43. In this case, the transmission circuit 4 can switch the connection regarding the first amplitude modulation section 451 and the second amplitude modulation section 452 by switching the bias condition of the transistor which is not to be used.

As described above, with the transmission circuit 4 according to the fourth embodiment of the present invention, the output from the amplitude modulation section does not become too small even at the time of small output. Therefore, like in the first embodiment, the transmission circuit 4 can output transmission signals with a low distortion and a high efficiency over a wide range of output power.

Fifth Embodiment

FIG. 17 is a block diagram showing an exemplary structure of a transmission circuit 5 according to a fifth embodiment of the present invention. As shown in FIG. 17, the transmission circuit 5 includes a signal generation section 11, an angle modulation section 12, a power source terminal 13, a regulator 14, a first amplitude modulation section 551, a second amplitude modulation section 552, an output terminal 17, a variable gain amplification section 28, a control section 29, a dividing section 51, a combine section 52, and a switch 53.

In the transmission circuit 5, like in the transmission circuit 4, an assembly of the first amplitude modulation section 551, the second amplitude modulation section 552, the dividing section 51, the combine section 52 and the switch 53 may be labeled simply as an amplitude modulation section 21e.

An angle-modulated signal which is output from the angle modulation section 12 is divided by the dividing section 51 and input to the first amplitude modulation section 551 and the second amplitude modulation section 552. The components of the angle-modulated signal divided by the dividing section 51 have an equal power to each other.

The first amplitude modulation section 551 and the second amplitude modulation section 552 each perform amplitude modulation on the angle-modulated signal with a signal supplied from the regulator 14, and output the resultant signal as a modulated signal. In this example, the first amplitude modulation section 551 and the second amplitude modulation section 552 have the same transistor size. Namely, the first amplitude modulation section 551 and the second amplitude modulation section 552 have an equal maximum output power. The first amplitude modulation section 551 and the second amplitude modulation section 552 have a structure substantially the same as that shown in FIG. 7 or FIG. 8. The modulated signals which are output from the first amplitude modulation section 551 and the second amplitude modulation section 552 are combined by the combine section 52, and output from the output terminal 17 as a transmission signal.

The control section 59 controls the variable gain amplification section 28 and also switches the connection of the switch 53, in accordance with the value of the power information P. Specifically, when the value of the power information P is equal to or greater than a predetermined threshold value, the control section 59 decreases the gain of the variable gain amplification section 28 and switches the connection of the switch 53 such that the regulator 14 and the first amplitude modulation section 551 are connected to each other. Thus, the first amplitude modulation section 551 is used. Namely, when the value of the power information P is equal to or greater than the predetermined threshold value, the transmission circuit 5 outputs a sum of the output power of the first amplitude modulation section 551 and the output power of the second amplitude modulation section 552 as an output power of the transmission signal.

The control section 59 may control the magnitude of the signal supplied from the regulator 14 to the first amplitude modulation section 551 by changing the resistance of the transistor used in the switch 53.

When the value of the power information P is smaller than the predetermined threshold value, the control section 59 switches the connection of the switch 53 such that the regulator 14 and the first amplitude modulation section 551 are disconnected from each other. Thus, the operation of the first amplitude modulation section 551 is turned off. Namely, when the value of the power information P is smaller than the predetermined threshold value, the transmission circuit 5 outputs the output power of the second amplitude modulation section 552 as an output power of the transmission signal.

For the dividing section 51 and the combine section 52, a Wilkinson type device or a 3 dB directional coupler may be used. In such a case, when the operation of the first amplitude modulation section 551 is turned off, a power which is smaller by 6 dB than the output power of the second amplitude modulation section 552 is output from the output terminal 17. The relationship between the value of the power information P and the output power from the second amplitude modulation section 552 is substantially the same as that shown in FIG. 3C. The dividing section 51 does not need to divide the signal equally, and the combine section 52 does not need to combine the signals equally. When the division or the combination is not performed equally, the first amplitude modulation section 551 and the second amplitude modulation section 552 having transistor sizes corresponding to the dividing ratio of the dividing section 51 or the combination ratio of the combine section 52 may be used.

The control section 59 may control the variable gain amplification section 28 and switch the connection of the switch 53, in accordance with the modulation mode of the transmission circuit 5 instead of the value of the power information P. For example, it is assumed that the transmission circuit 5 uses, as modulation modes, UMTS for controlling the range of −50 dBm to 24 dBm and GSM/EDGE for controlling the range of 5 dBm to 33 dBm. In this case, when the modulation mode is UMTS, the control section 59 increases the gain of the variable gain amplification section 28 and switches the connection of the switch 53 such that the regulator 14 and the first amplitude modulation section 551 are connected to each other. When the modulation mode is GSM/EDGE, the control section 59 decreases the gain of the variable gain amplification section 28 and switches the connection of the switch 53 such that the regulator 14 and the first amplitude modulation section 551 are disconnected from each other.

As described above, with the transmission circuit 5 according to the fifth embodiment of the present invention, the output from the amplitude modulation section does not become too small even at the time of small output. Therefore, like in the first embodiment, the transmission circuit 5 can output transmission signals with a low distortion and a high efficiency over a wide range of output power.

Figure 18:
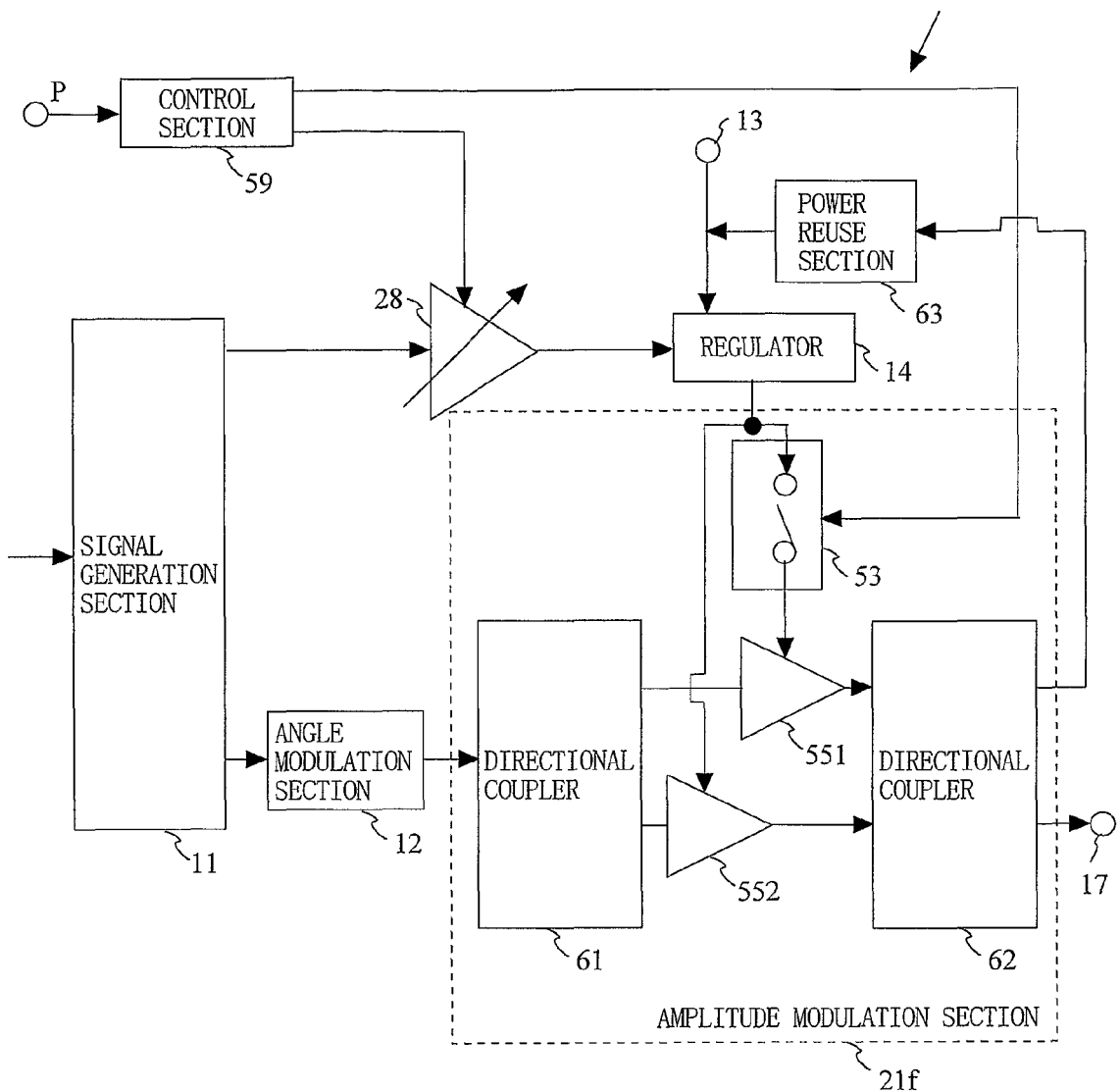
FIG. 18 is a block diagram showing an exemplary structure of a transmission circuit 5b according to the fifth embodiment of the present invention.

In order to improve the power consumption at the time of small output, the transmission circuit according to the fifth embodiment may have a structure shown in FIG. 18. FIG. 18 is a block diagram showing an exemplary structure of a transmission circuit 5b according to the fifth embodiment of the present invention. As compared with the transmission circuit 5 described above with reference to FIG. 17, the transmission circuit 5b shown in FIG. 18 uses a first directional coupler 61 as the dividing section 51 and a second directional coupler 62 as the combine section 52. The transmission circuit 5b further includes a power reuse section 63. The power reuse section 63 converts an input signal into a power and supplies the power to the regulator 14 as a power to be reused.

In the transmission circuit 5b, like in the fourth embodiment, an assembly of the first amplitude modulation section 551, the second amplitude modulation section 552, the first directional coupler 61, the second directional coupler 62 and the switch 53 may be labeled simply as an amplitude modulation section 21f.

The first directional coupler 61 equally divides an angle-modulated signal which is output from the angle modulation section 12 for the first amplitude modulation section 551 and the second amplitude modulation section 552. One of two outputs of the second directional coupler 62 is connected to the output terminal 17, and the other output is connected to the power reuse section 63. The second directional coupler 62 has a passage phase which is adjusted to allow most of the output power from the first and second amplitude modulation sections 551 and 552 to be output from the output terminal 17 when both of the two amplitude modulation sections 551 and 552 operate. Therefore, when the value of the power information P is equal to or greater than a predetermined threshold value, almost no power is input to the power reuse section 63.

When only the second amplitude modulation section 552 operates, the second directional coupler 62 equally divides a modulated signal which is output from the second amplitude modulation section 552 for the output terminal 17 and the power reuse section 63. The output of the power reuse section 63 is connected to the power source terminal 13 for the regulator 14. The power reuse section 63 converts the modulated signal which is input thereto via the second directional coupler 62 into a DC voltage (or a DC current) and supplies the DC voltage (or the DC current) to the regulator 14. Therefore, when the value of the power information P is smaller than the predetermined threshold value, one of the modulated signals equally divided by the second directional coupler 62 is reused as the power for the regulator 14.

Figure 19:
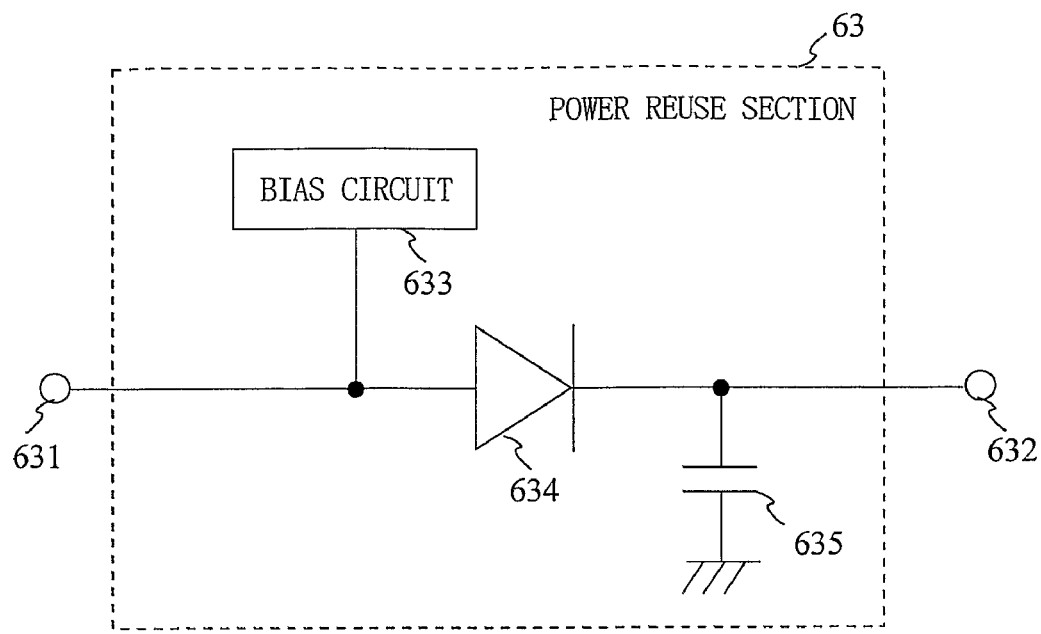
FIG. 19 is a block diagram showing an example of a power reuse section 63.

FIG. 19 is a block diagram showing an example of the power reuse section 63. As shown in FIG. 19, the power reuse section 63 includes an input terminal 631, an output terminal 632, a bias circuit 633, a diode 634, and a capacitor 635. A signal which is input from the input terminal 631 is output from the output terminal 632 via the diode 634. The diode 634 is supplied with a bias voltage via the bias circuit 633. The signal which is output from the diode 634 is smoothed by the capacitor 635. Owing to such a structure, the transmission circuit 5b reuses a part of the energy of the signal output from the second amplitude modulation section 552, which would otherwise be a loss. Therefore, the power consumption of the transmission circuit 5b can be reduced.

Sixth Embodiment

FIG. 20 is a block diagram showing an exemplary structure of a transmission circuit 6 according to a sixth embodiment of the present invention. Referring to FIG. 20, the transmission circuit 6 is different from the transmission circuit 1 according to the first embodiment in a control section 19b and a regulator 14d. The control section 19b outputs power information P in addition to having the functions of the control section 19 according to the first embodiment. The regulator 14d includes a series regulator 14a and a switching regulator 14b. The series regulator 14a has, for example, a structure shown in FIG. 4. The switching regulator 14b has, for example, a structure shown in FIG. 5.

Figure 21A:
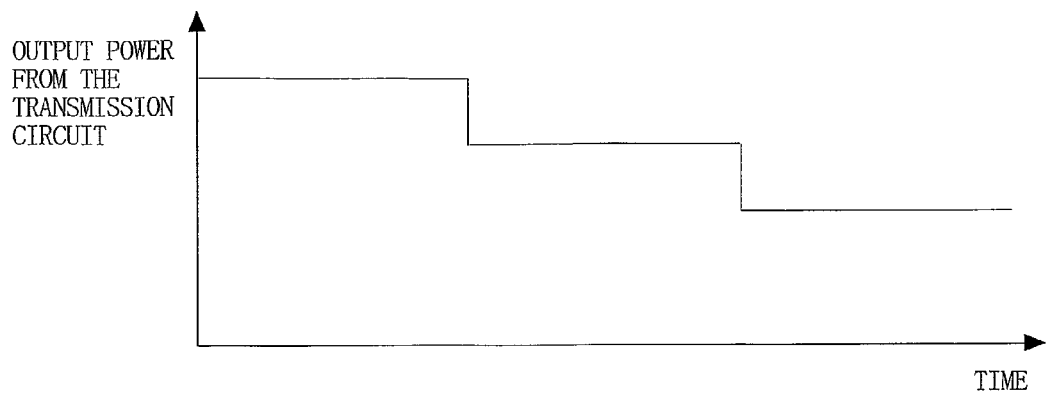
FIG. 21A shows an example of the output power from the transmission circuit 6 represented by the power information P.
Figure 21B:
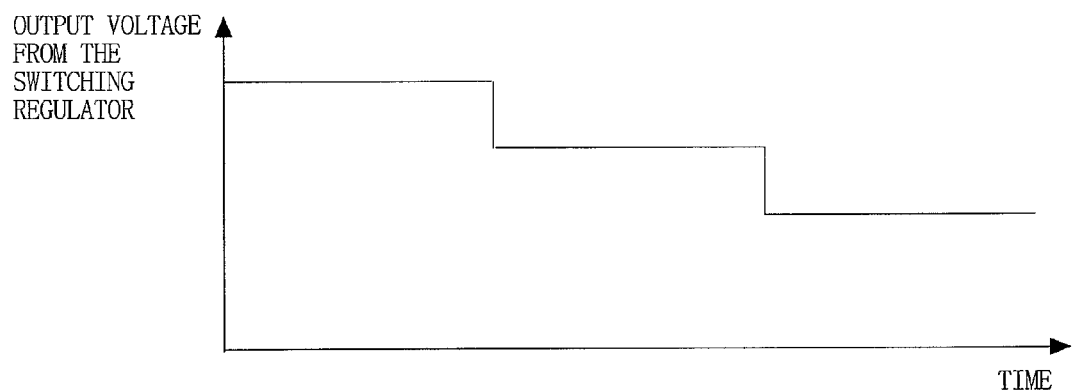
Figure 21C:
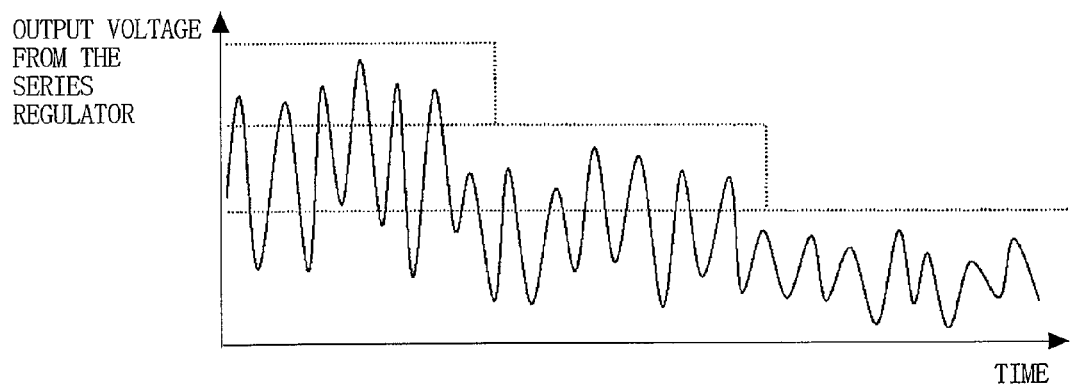
FIG. 21C shows an example of the output voltage from a switching regulator 14b.

With reference to FIG. 21A through FIG. 21C, an operation of the transmission circuit 6 will be described. FIG. 21A shows an example of the output power from the transmission circuit 6 represented by the power information P. FIG. 21B shows an example of the output voltage from the series regulator 14a. FIG. 21C shows an example of the output voltage from the switching regulator 14b. The power information P which is output from the control section 19b is input to the switching regulator 14b (see FIG. 21A). The switching regulator 14b may directly receive the power information P which is input to the transmission circuit 6 instead of from the control section 19b.

The switching regulator 14b is supplied with a DC voltage from the power source terminal 13. The switching regulator 14b supplies a voltage controlled in accordance with the power information P to the series regulator 14a (see FIG. 21B). Since the power information P has a lower frequency than that of the amplitude signal, the switching regulator 14b can operate at a higher efficiency. The voltage which is output from the switching regulator 14b is set to be equal to or slightly higher than the maximum voltage output from the series regulator 14a.

The series regulator 14a amplifies an amplitude signal which is input via the variable gain amplification section 18 with the voltage supplied from the switching regulator 14b, and thus supplies a voltage controlled in accordance with the magnitude of the amplitude signal to the amplitude modulation section 15 (see FIG. 21C). Since the voltage supplied from the switching regulator 14b is optimally controlled, the series regulator 14a can operate at a high efficiency.

The control section 19 and the regulator 14d described above are applicable to the second through fifth embodiments as well as to the first embodiment.

As described above, the transmission circuit 6 according to the sixth embodiment of the present invention uses the regulator 14d including both the series regulator 14a and the switching regulator 14b. Therefore, the transmission circuit 6 can reduce the loss at the series regulator 14a, and as a result, can reduce the power consumption of the entire transmission circuit over a wide range of output power.

Figure 22A:
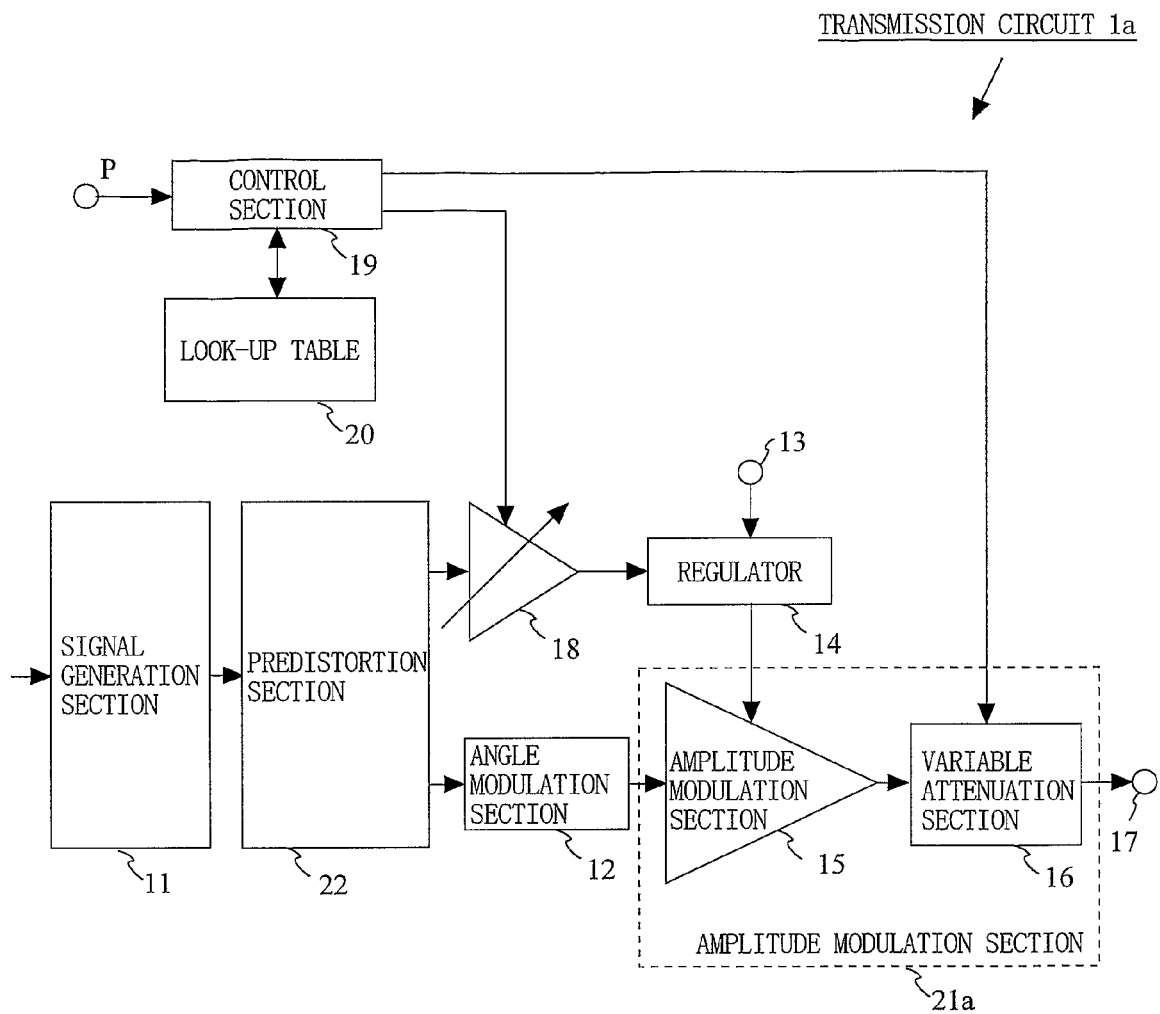
FIG. 22A is a block diagram showing an exemplary structure of a transmission circuit 1a including a predistortion section.

The above-described transmission circuits according to the first through sixth embodiments may further include a predistortion section for compensating for a distortion of an amplitude signal and/or a phase signal generated by the signal generation section 11 in order to compensate for the nonlinearity of at least one of the angle modulation section 12, the regulator 14, the amplitude modulation section 15, the variable attenuation section 16 and the variable gain amplification section 18. FIG. 22A is a block diagram showing an exemplary structure of a transmission circuit 1a including a predistortion section. Referring to FIG. 22A, a predistortion section 22 compensates for an amplitude signal and/or a phase signal generated by the signal generation section 11 so as to suppress the distortion generated in at least one of the angle modulation section 12, the regulator 14, the amplitude modulation section 15, the variable attenuation section 16 and the variable gain amplification section 18. In this way, the transmission circuit 1a can further improve the linearity of the transmission signal as compared with the transmission circuits according to the first through sixth embodiments.

The above-described transmission circuits according to the first through sixth embodiments may adjust the attenuation of the variable attenuation section and the gain of the variable gain amplification section based on the output power from the amplitude modulation section, instead of based on the value of the input power information P. FIG. 22B is a block diagram showing an exemplary structure of a transmission circuit 1b for adjusting the attenuation of the variable attenuation section and the gain of the variable gain amplification section based on the output power from the amplitude modulation section. Referring to FIG. 22B, a control section 19c adjusts the attenuation of the variable attenuation section 16 and the gain of the variable gain amplification section 18 based on the output power from the amplitude modulation section 15.

Seventh Embodiment

Figure 23:
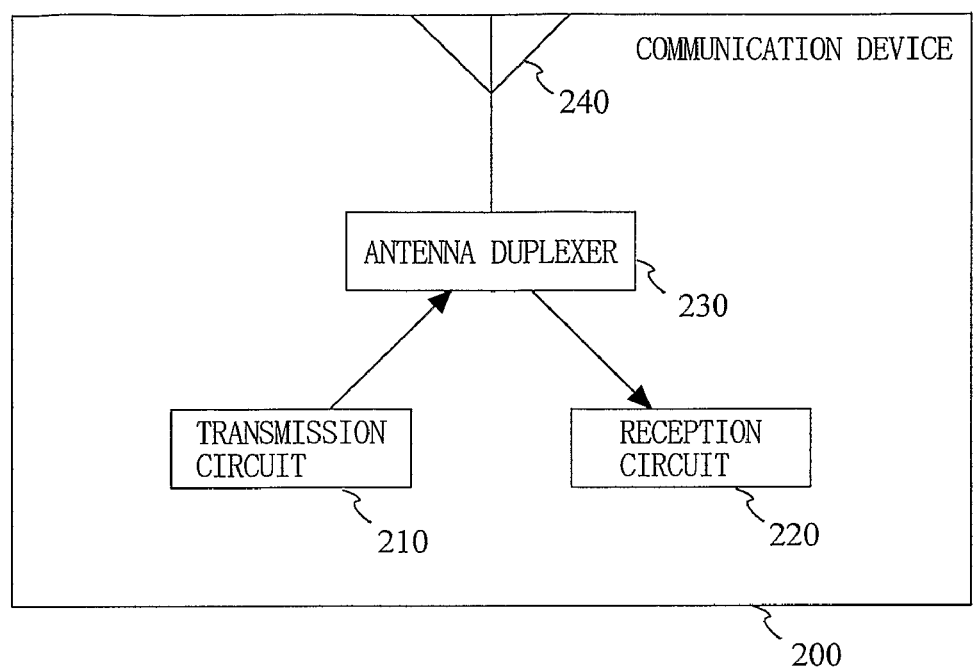
FIG. 23 is a block diagram showing an exemplary structure of a communication device according to a seventh embodiment of the present invention.
Figure 24:
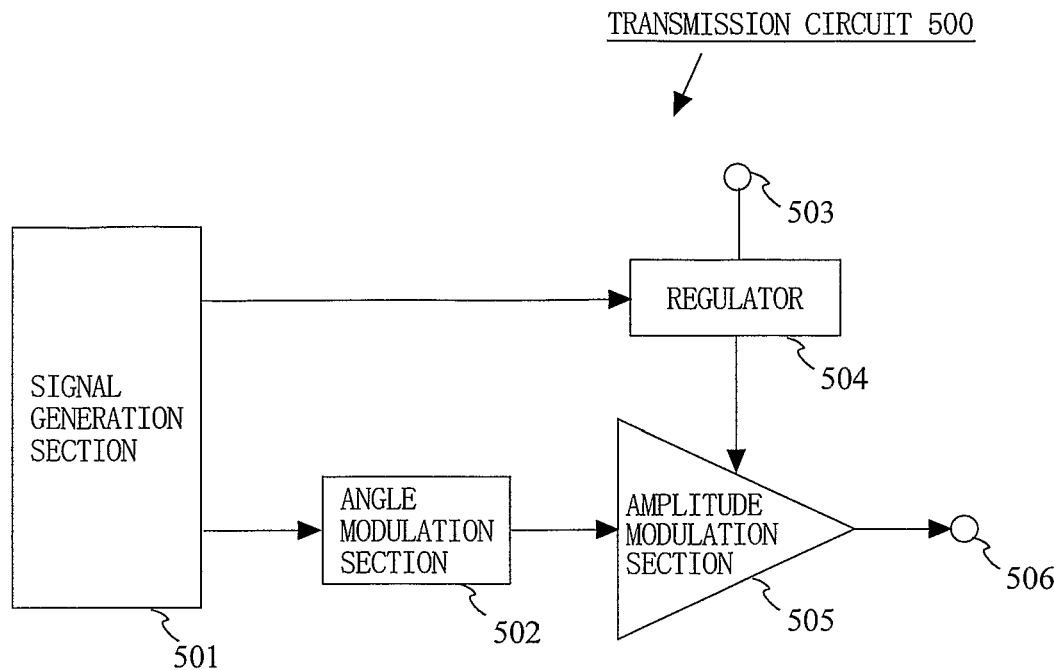
FIG. 24 is a block diagram showing a structure of a conventional transmission circuit 500 using the polar modulation method.
Figure 25:
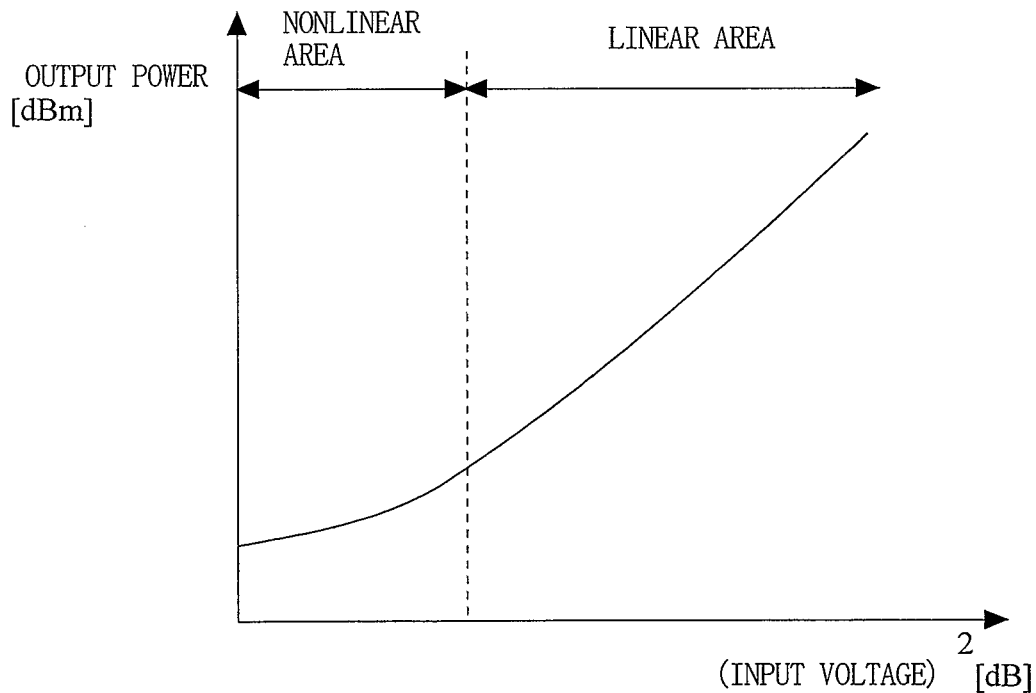
FIG. 25 shows a characteristic of the output power from an amplitude modulation section 505 with respect to the input voltage from a regulator 504 of the conventional transmission circuit 500.

FIG. 23 is a block diagram showing an exemplary structure of a communication device according to a seventh embodiment of the present invention. As shown in FIG. 23, a communication device 200 according to the seventh embodiment includes a transmission circuit 210, a reception circuit 220, an antenna duplexer 230, and an antenna 240. The transmission circuit 210 is a transmission circuit described in any of the first through sixth embodiments. The antenna duplexer 230 transmits a transmission signal output from the transmission circuit 210 to the antenna 240 and prevents the transmission signal from leaking to the reception circuit 220. The antenna duplexer 230 also transmits a receiving signal input from the antenna 240 to the reception circuit 220 and prevents the receiving signal from leaking to the transmission circuit 210.

Owing to such a structure, a transmission signal is output from the transmission circuit 210 and released to the space from the antenna 240 via the antenna duplexer 230. A receiving signal is received by the antenna 240 and then by the reception circuit 220 via the antenna duplexer 230. The communication device 200 according to the seventh embodiment can obtain the linearity of a transmission signal with certainty and realize a low distortion of a wireless device by using a transmission circuit according to any one of the first through sixth embodiments. Since no branching element such as a directional coupler or the like is provided outside the transmission circuit 210, the loss from the transmission circuit 210 to the antenna 240 can be reduced. Therefore, the power consumption at the time of transmission can be reduced, which allows the communication device 200 to be used for a long period of time as a wireless communication device. The communication device 200 may include only the transmission circuit 210 and the antenna 240.

INDUSTRIAL APPLICABILITY

A transmission circuit according to the present invention is applicable to, for example, a communication device such as a mobile phone, a wireless LAN device or the like.

The invention claimed is:

1. A transmission circuit for generating a transmission signal based on input data and outputting the transmission signal, the transmission circuit comprising:
   a signal generation section for generating an amplitude signal and a phase signal based on an amplitude component and a phase component obtained by performing signal processing on the data;
   a variable gain amplification section for amplifying or attenuating the amplitude signal with a controlled gain;
   a regulator for outputting a signal in accordance with a magnitude of the amplitude signal which is output from the variable gain amplification section;
   an angle modulation section for performing angle modulation on the phase signal and outputting the resultant signal as an angle-modulated signal;
   an amplitude modulation section for performing amplitude modulation on the angle-modulated signal with the signal which is output from the regulator into a modulated signal, attenuating the modulated signal with a controlled attenuation, and outputting the resultant signal as a transmission signal; and
   a control section for receiving power information representing a level of a power of a transmission signal to be output, and controlling a gain to be set in the variable gain amplification section and an attenuation to be set in the amplitude modulation section based on the power information;

wherein the control section compares a value of the power information with at least one predetermined threshold value, and determines the gain to be set in the variable gain amplification section and the attenuation to be set in the amplitude modulation section based on the comparison result.

2. A transmission circuit according to claim 1, wherein:
the amplitude modulation section includes:
  a first amplitude modulation section for performing amplitude modulation on the angle-modulated signal with the signal which is output from the regulator and outputting the resultant signal as a modulated signal; and
  a variable attenuation section for attenuating the modulated signal with the controlled attenuation and outputting the resultant signal as a transmission signal; and
when the value of the power information is smaller than the at least one predetermined threshold value, the control section sets a predetermined gain in the variable gain amplification section and sets a predetermined attenuation in the variable attenuation section.

3. A transmission circuit according to claim 2, further comprising a look-up table in which attenuations which can be set in the variable attenuation section and gains which can be set in the variable gain amplification section are registered in correspondence with values of the power information; wherein:
  the attenuations which can be set in the variable attenuation section and the gains which can be set in the variable gain amplification section are in proportion to each other; and
  the control section determines the attenuation to be set in the variable attenuation section and the gain to be set in the variable gain amplification section based on the look-up table.

4. A transmission circuit according to claim 2, wherein:
the variable gain amplification section includes:
  at least one amplifier for amplifying an input signal with a specific gain and outputting the resultant signal; and
  a plurality of switches for switching the connection of the at least one amplifier;
the variable attenuation section includes:
  at least one attenuator for attenuating an input signal with a specific attenuation and outputting the resultant signal; and
  a plurality of switches for switching the connection of the at least one attenuator; and
the control section compares the value of the power information with the at least one predetermined threshold value, and switches the connection of the plurality of switches in the variable gain amplification section and the connection of the plurality of switches in the variable attenuation section based on the comparison result.

5. A transmission circuit according to claim 1, wherein:
the amplitude modulation section includes:
  a first amplitude modulation section for performing amplitude modulation on the angle-modulated signal with the signal which is output from the regulator and outputting the resultant signal as a modulated signal;
  a second amplitude modulation section for performing amplitude modulation on the angle-modulated signal with the signal which is output from the regulator and outputting the resultant signal as a modulated signal; and
  a plurality of switches for switching the connection between the regulator and the first amplitude modulation section or the second amplitude modulation section;
the second amplitude modulation section has a larger maximum output power than the first amplitude modulation section; and
when the value of the power information is smaller than a predetermined threshold value, the control section increases the gain of the variable gain amplification section and switches the connection of the plurality of switches such that the first amplitude modulation section is used; and
when the value of the power information is equal to or greater than the predetermined threshold value, the control section decreases the gain of the variable gain amplification section and switches the connection of the plurality of switches such that the second amplitude modulation section is used.

6. A transmission circuit according to claim 1, wherein:
the amplitude modulation section includes:
  a first amplitude modulation section for performing amplitude modulation on the angle-modulated signal with the signal which is output from the regulator and outputting the resultant signal as a modulated signal;
  a second amplitude modulation section for performing amplitude modulation on the angle-modulated signal with the signal which is output from the regulator and outputting the resultant signal as a modulated signal;
  a switch for switching the connection between the regulator and the first amplitude modulation section;
  a dividing section for dividing the angle-modulated signal for the first amplitude modulation section and the second amplitude modulation section; and
  a combine section for combining the modulated signal which is output from the first amplitude modulation section and the modulated signal which is output from the second amplitude modulation section, and outputting the resultant signal as a transmission signal;
the first amplitude modulation section and the second amplitude modulation section have an equal maximum output power;
when the value of the power information is smaller than a predetermined threshold value, the control section increases the gain of the variable gain amplification section and switches the connection of the switch such that the regulator and the first amplitude modulation section are disconnected from each other; and
when the value of the power information is equal to or greater than the predetermined threshold value, the control section decreases the gain of the variable gain amplification section and switches the connection of the switch such that the regulator and the first amplitude modulation section are connected to each other.

7. A transmission circuit according to claim 6, further comprising a power reuse section for converting an input signal to a power and supplying the power to the regulator; wherein:
the dividing section is a first directional coupler for equally dividing the angle-modulated signal for the first amplitude modulation section and the second amplitude modulation section;
the combine section is a second directional coupler for outputting the modulated signals which are output from the first amplitude modulation section and the second amplitude modulation section in a combined form or in a divided form;

when the first amplitude modulation section and the second amplitude modulation section both operate, the second directional coupler combines the modulated signals which are output from the first amplitude modulation section and the second amplitude modulation section and outputs the resultant signal as a transmission signal; and when only the second amplitude modulation section operates, the second directional coupler equally divides the modulated signal which is output from the second amplitude modulation section, and outputs one resultant signal component as a transmission signal and outputs the other resultant signal component to the power reuse section.

8. A transmission circuit according to claim 1, wherein the regulator is a series regulator.

9. A transmission circuit according to claim 1, wherein the regulator is a switching regulator.

10. A transmission circuit according to claim 1, wherein:
the regulator includes a switching regulator and a series regulator;
the switching regulator receives the power information and supplies a voltage controlled in accordance with the power information to the series regulator; and
the series regulator supplies a voltage controlled in accordance with the magnitude of the amplitude signal which is output from the variable gain amplification section to the amplitude modulation section using the voltage supplied from the switching regulator.

11. A transmission circuit for generating a transmission signal based on input data and outputting the transmission signal, the transmission circuit comprising:
a signal generation section for generating an amplitude signal and an angle-modulated signal based on an amplitude component and a phase component obtained by performing signal processing on the data;
a variable gain amplification section for amplifying or attenuating the amplitude signal with a controlled gain;
a regulator for outputting a signal in accordance with a magnitude of the amplitude signal which is output from the variable gain amplification section;
an amplitude modulation section for performing amplitude modulation on the angle-modulated signal with the signal which is output from the regulator into a modulated signal, attenuating the modulated signal with a controlled attenuation, and outputting the resultant signal as a transmission signal; and
a control section for receiving power information representing a level of a power of a transmission signal to be output, and controlling a gain to be set in the variable gain amplification section and an attenuation to be set in the amplitude modulation section based on the power information;

wherein:
the signal generation section includes:
a quadrature signal generation section for generating a baseband signal including an in-phase signal and a quadrature-phase signal, which are quadrature data, by performing signal processing on the data;
a vector modulation section for performing vector modulation on the in-phase signal and the quadrature-phase signal;
an envelope detection section for detecting an envelope component of the signal which is output from the vector modulation section and outputting the detected envelope component as the amplitude signal; and
a limiter for limiting the envelope component of the signal which is output from the vector modulation section to a predetermined magnitude and outputting the magnitude-limited signal as the angle-modulated signal; and
the control section compares a value of the power information with at least one predetermined threshold value, and determines the gain to be set in the variable gain amplification section and the attenuation to be set in the amplitude modulation section based on the comparison result.

12. A communication device, comprising:
a transmission circuit for generating a transmission signal; and
an antenna for outputting the transmission signal generated by the transmission circuit;
wherein the transmission circuit is a transmission circuit according to claim 1.

13. A communication device according to claim 12, further comprising:
a reception circuit for processing a receiving signal received via the antenna; and
an antenna duplexer for outputting the transmission signal generated by the transmission circuit to the antenna, and outputting the receiving signal received via the antenna to the reception circuit.

* * * * *